(12) United States Patent
Kobayashi et al.

(10) Patent No.: US 9,018,870 B2
(45) Date of Patent: Apr. 28, 2015

(54) CONTROL DEVICE

(75) Inventors: Hirokazu Kobayashi, Obu (JP); Arinori Shimada, Nishio (JP); Takeshi Aoki, Nishio (JP); Subrata Saha, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 146 days.

(21) Appl. No.: 13/983,443

(22) PCT Filed: Mar. 23, 2012

(86) PCT No.: PCT/JP2012/057580
§ 371 (c)(1),
(2), (4) Date: Aug. 2, 2013

(87) PCT Pub. No.: WO2012/133220
PCT Pub. Date: Oct. 4, 2012

(65) Prior Publication Data
US 2013/0307449 A1    Nov. 21, 2013

(30) Foreign Application Priority Data

Mar. 25, 2011    (JP) .................................. 2011-068144

(51) Int. Cl.
*H02P 21/05*    (2006.01)
*B60K 6/48*    (2007.10)
(Continued)

(52) U.S. Cl.
CPC . *H02P 21/05* (2013.01); *B60K 6/48* (2013.01); *B60W 10/08* (2013.01); *B60W 20/00* (2013.01);
(Continued)

(58) Field of Classification Search
CPC ........... H02P 21/05; G05D 17/02; B60K 6/00
USPC ......... 318/432, 434, 400.02, 400.23; 700/280
See application file for complete search history.

(56) References Cited

U.S. PATENT DOCUMENTS 5,967,940 A * 10/1999 Yamaguchi ................... 477/107
2006/0132082 A1    6/2006 Ihm et al.
2014/0100701 A1 * 4/2014 Hakumura et al. ........... 700/280

FOREIGN PATENT DOCUMENTS

JP    A-2004-64909    2/2004
JP    A-2006-33969    2/2006
(Continued)

OTHER PUBLICATIONS

Fukuda et al., "A Novel Current Control Method for Active Filters Using Sinusoidal Internal Model," IEEE Transactions on Industry Applications, vol. 37, No. 3, May/Jun. 2001 (with translation).
Laseu et al., "High Performance Current Controller for Selective Harmonic Compensation in Active Power Filters," IEE Transactions of Power Electronics, vol. 22, No. 5, Sep. 2007.
Jun. 5, 2012 International Search Report issued in International Patent Application No. PCT/JP2012/057580.

*Primary Examiner* — Paul Ip
(74) *Attorney, Agent, or Firm* — Oliff PLC

(57) ABSTRACT

A control device for a rotating electrical machine, which is able to reduce a tracking delay of an actual output torque and actual currents with respect to a fluctuating torque command and fluctuating current commands and to reduce steady state deviations, is obtained. The control device includes a torque current computing unit; an actual current computing unit; a current feedback control unit; and a voltage control unit that controls voltages on the basis of the two-phase voltage commands. The torque command includes a fluctuation cancellation torque command for cancelling transmission torque fluctuations transmitted from the internal combustion engine, and the current feedback control unit includes a harmonic controller that calculates the two-phase voltage commands by using a characteristic of a transfer function corresponding to a periodic function of a frequency of the transmission torque fluctuations.

5 Claims, 15 Drawing Sheets

(51) Int. Cl.
    *B60W 10/08*    (2006.01)
    *B60W 20/00*    (2006.01)
    *H02P 21/06*    (2006.01)
    *B60W 50/00*    (2006.01)

(52) U.S. Cl.
    CPC .................. *B60W 2050/0008* (2013.01); *B60W 2050/0041* (2013.01); *B60W 2510/083* (2013.01); *B60W 2710/08* (2013.01); *B60W 2710/083* (2013.01); *Y02T 10/56* (2013.01); *Y02T 10/6221* (2013.01); *H02P 21/06* (2013.01); *Y02T 10/7258* (2013.01)

(56) References Cited

FOREIGN PATENT DOCUMENTS

| | | |
|---|---|---|
| JP | A-2006-67718 | 3/2006 |
| JP | A-2006-180687 | 7/2006 |
| JP | A-2006-191737 | 7/2006 |
| JP | A-2009-106069 | 5/2009 |

\* cited by examiner

F I G . 2
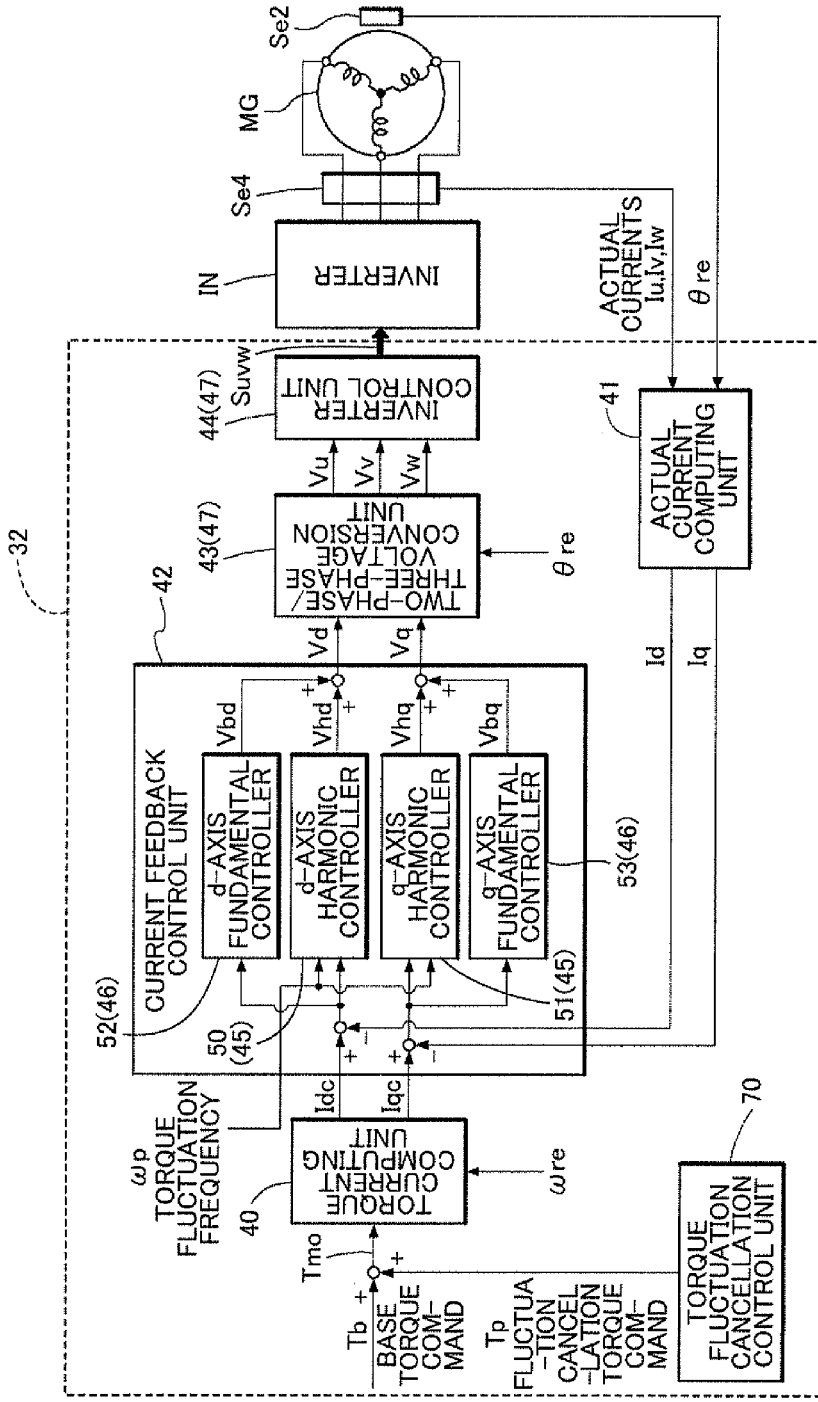

CONTROL DEVICE

INCORPORATION BY REFERENCE

The disclosure of Japanese Patent Application No. 2011-068144 filed on Mar. 25, 2011 including the specification, drawings and abstract is incorporated herein by reference in its entirety.

BACKGROUND OF THE INVENTION

The present invention relates to a control device used to control a rotating electrical machine that is drivably coupled to an internal combustion engine and that is drivably coupled to a wheel.

DESCRIPTION OF THE RELATED ART

For the above-described control device, for example, Japanese Patent Application Publication No. 2006-33969 (JP 2006-033969 A) describes a technique for causing a rotating electrical machine to output a torque for damping torque fluctuations that are transmitted from an internal combustion engine. At this time, a torque command intended for the rotating electrical machine is a torque command that is opposite in phase to the transmission torque fluctuations.

In addition, in order to reduce a torque ripple output from a rotating electrical machine, Japanese Patent Application Publication No. 2004-64909 (JP 2004-64909 A) describes a technique for superimposing harmonics for reducing the torque ripple on current commands in a current feedback system of the rotating electrical machine.

However, the control device for the rotating electrical machine uses a proportional-plus-integral (PI) controller such that DC current commands are tracked, so there occur a delay in response to the fluctuating commands. Therefore, in JP 2006-033969 A, an actual output torque and actual currents respectively track the fluctuating torque command and the fluctuating current commands with a phase delay, and produce steady state deviations, with the result that a sufficient fluctuation damping effect and a sufficient torque ripple reduction effect may not be obtained. In addition, in the technique described in JP 2004-64909 A, fluctuating command components are extracted by a high-pass filter, so there is a problem that the technique is weak in transient response and noise.

SUMMARY OF THE INVENTION

There is a need for a control device for a rotating electrical machine, which is able to reduce steady state deviations by reducing a tracking delay in an actual output torque and actual currents with respect to a fluctuating torque command and fluctuating current commands while suppressing the influence of noise.

A feature of the configuration of a control device used to control a rotating electrical machine that is drivably coupled to an internal combustion engine and that is drivably coupled to a wheel according to an aspect of the present invention includes: a torque current computing unit that uses a two-axis rotating coordinate system that is a rotating coordinate system having two axes that rotate in synchronization with rotation of the rotating electrical machine, and that computes two-phase current commands, which express current commands to be flowed through the rotating electrical machine in the two-axis rotating coordinate system, on the basis of a torque command that the rotating electrical machine is caused to output; an actual current computing unit that computes two-phase actual currents expressed in the two-axis rotating coordinate system on the basis of actual currents flowing through the rotating electrical machine; a current feedback control unit that varies two-phase voltage commands, which express voltage commands to be applied to the rotating electrical machine in the two-axis rotation coordinate system, such that the two-phase actual currents approach the two-phase current commands; and a voltage control unit that controls voltages to be applied to the rotating electrical machine on the basis of the two-phase voltage commands, wherein the torque command includes a fluctuation cancellation torque command that is a torque command for cancelling transmission torque fluctuations that are torque fluctuations transmitted from the internal combustion engine to the rotating electrical machine, and the current feedback control unit includes a harmonic controller that calculates the two-phase voltage commands by using a characteristic of a transfer function corresponding to a periodic function of a torque fluctuation frequency that is a frequency of the transmission torque fluctuations.

In the present application, the "rotating electrical machine" includes all of a motor (electric motor), a generator (power generator) and, where necessary, a motor generator that provides both the function of a motor and the function of a generator.

In the present application, the "drivable coupling" indicates a state where two rotating elements are coupled to each other such that driving force is transmittable, and includes a state where the two rotating elements are coupled to each other so as to be integrally rotatable or a state where the two rotating elements are coupled to each other via one or two or more transmission members such that driving force is transmittable. Such transmission members include various members that transmit rotation at the same speed or at a shifted speed, and, for example, include a shaft, a gear mechanism, a belt, a chain, and the like. Such transmission members may include an engagement element that selectively transmits rotation and driving force, such as a friction clutch and a dog clutch.

With the above-described feature of the configuration, the fluctuation cancellation torque command for cancelling the transmission torque fluctuations from the internal combustion engine includes the frequency component of the transmission torque fluctuations, and the two-phase current commands that express the torque command including the fluctuation cancellation torque command in the two-axis rotating coordinate system also include the frequency component of the transmission torque fluctuations. That is, the transfer function corresponding to the two-phase current commands that become inputs to the current feedback control system includes the transfer function corresponding to the periodic function of the frequency of the transmission torque fluctuations.

With the above-described feature of the configuration, the current feedback control unit is configured to calculate the two-phase voltage commands using the characteristic of the transfer function corresponding to the periodic function of the frequency of the transmission torque fluctuations, so the transfer function corresponding to the two-phase current commands is included in the current feedback control system.

Therefore, the current feedback control unit includes the transfer function corresponding to the periodic function of the frequency of the transmission torque fluctuations, which is a transfer function similar to the transfer function included in the two-phase current commands that are commands to be input to the feedback control unit, so it is possible to cause the two-phase actual currents to track the frequency component of the transmission torque fluctuations included in the two-phase current commands by reducing the steady state deviations. Thus, it is possible to cause the output torque of the rotating electrical machine to track the fluctuation cancellation torque command by reducing the steady state deviations, so it is possible to improve the effect of fluctuation cancellation control. Thus, by effectively cancelling the transmission torque fluctuations, transmitted from the internal combustion engine, with the use of the rotating electrical machine, it is possible to suppress transmission of the transmission torque fluctuations to the wheel.

The two-phase voltage commands calculated by the harmonic controller vary with a component of the periodic function of the torque fluctuation frequency, so they are less likely to be influenced by noise components.

Here, the harmonic controller may calculate the two-phase voltage commands by using an operator having a characteristic of a transfer function corresponding to a sinusoidal wave or cosinusoidal wave of the torque fluctuation frequency.

In the transmission torque fluctuations transmitted from the internal combustion engine to the rotating electrical machine, higher-order fluctuation components in the torque fluctuation frequency are attenuated through attenuation of a power transmission mechanism between the internal combustion engine and the rotating electrical machine, and the proportion of the sinusoidal or cosinusoidal component of the torque fluctuation frequency increases. Therefore, in the fluctuation cancellation torque command for cancelling the transmission torque fluctuations as well, the proportion of a sinusoidal or cosinusoidal component of the torque fluctuation frequency increases. Thus, in the inputs to the current feedback control system as well, the proportion of the characteristic of the transfer function corresponding to the sinusoidal wave or cosinusoidal wave of the torque fluctuation frequency increases.

With the above configuration, the harmonic controller uses the operator having the characteristic of the transfer function corresponding to the sinusoidal wave or cosinusoidal wave of the torque fluctuation frequency, so it is possible to cause the two-phase actual currents to track the sinusoidal or cosinusoidal components of the transmission torque fluctuations, which are included in the two-phase current commands, by reducing steady state deviations.

Here, the harmonic controller may calculate the two-phase voltage commands by using a characteristic in which characteristics of transfer functions corresponding to respective periodic functions of frequencies that are natural number multiples of 1 to n (n is a natural number larger than or equal to 2) of the torque fluctuation frequency are arranged in parallel with each other.

When the computation characteristic of the two-phase current commands for the torque command includes a higher-order function component, such as a curve or a polygonal line, the two-phase current commands computed for the torque command having the component of the torque fluctuation frequency includes frequency components that are twice or more of the torque fluctuation frequency. Thus, inputs to the current feedback control system also include the characteristics of the transfer functions corresponding to the periodic functions having frequencies that are twice or more of the torque fluctuation frequency.

With the above configuration, the harmonic controller calculates the two-phase voltage commands using the characteristics of the transfer functions corresponding to the periodic functions having the frequencies that are twice or more of the torque fluctuation frequency, so it is possible to cause the two-phase actual currents to track the components of the periodic functions having the frequencies that are twice or more of the torque fluctuation frequency, which are included in the two-phase current commands, by reducing the steady state deviations.

Here, the current feedback control unit may include: a proportional-plus-integral controller that calculates fundamental voltage commands through proportional computation and integral computation on the basis of deviations between the two-phase actual currents and the two-phase current commands; and the harmonic controller that calculates harmonic voltage commands through computation using the characteristic of the transfer function corresponding to the periodic function of the torque fluctuation frequency on the basis of the deviations, and the current feedback control unit may calculate the two-phase voltage commands by adding the fundamental voltage commands to the harmonic voltage commands.

With this configuration, it is possible to ensure trackability to the components of the two-phase current commands other than the torque fluctuation frequency with the use of the proportional-plus-integral controller, and to ensure trackability to the components of the torque fluctuation frequency with the use of the harmonic controller.

Here, the fluctuation cancellation torque command may include a sinusoidal component or cosinusoidal component of the frequency of the transmission torque fluctuations.

With this configuration, it is possible to identify the inputs to the current feedback control system as a sinusoidal wave or cosinusoidal wave and to simplify the inputs, so it becomes easy to set the harmonic controller corresponding to the inputs, and to improve trackability.

BRIEF DESCRIPTION OF THE DRAWINGS

FIG. 2 is a block diagram that shows the configuration of the control device according to the embodiment of the present invention;

DETAILED DESCRIPTION OF THE EMBODIMENTS

First Embodiment

Figure 1:
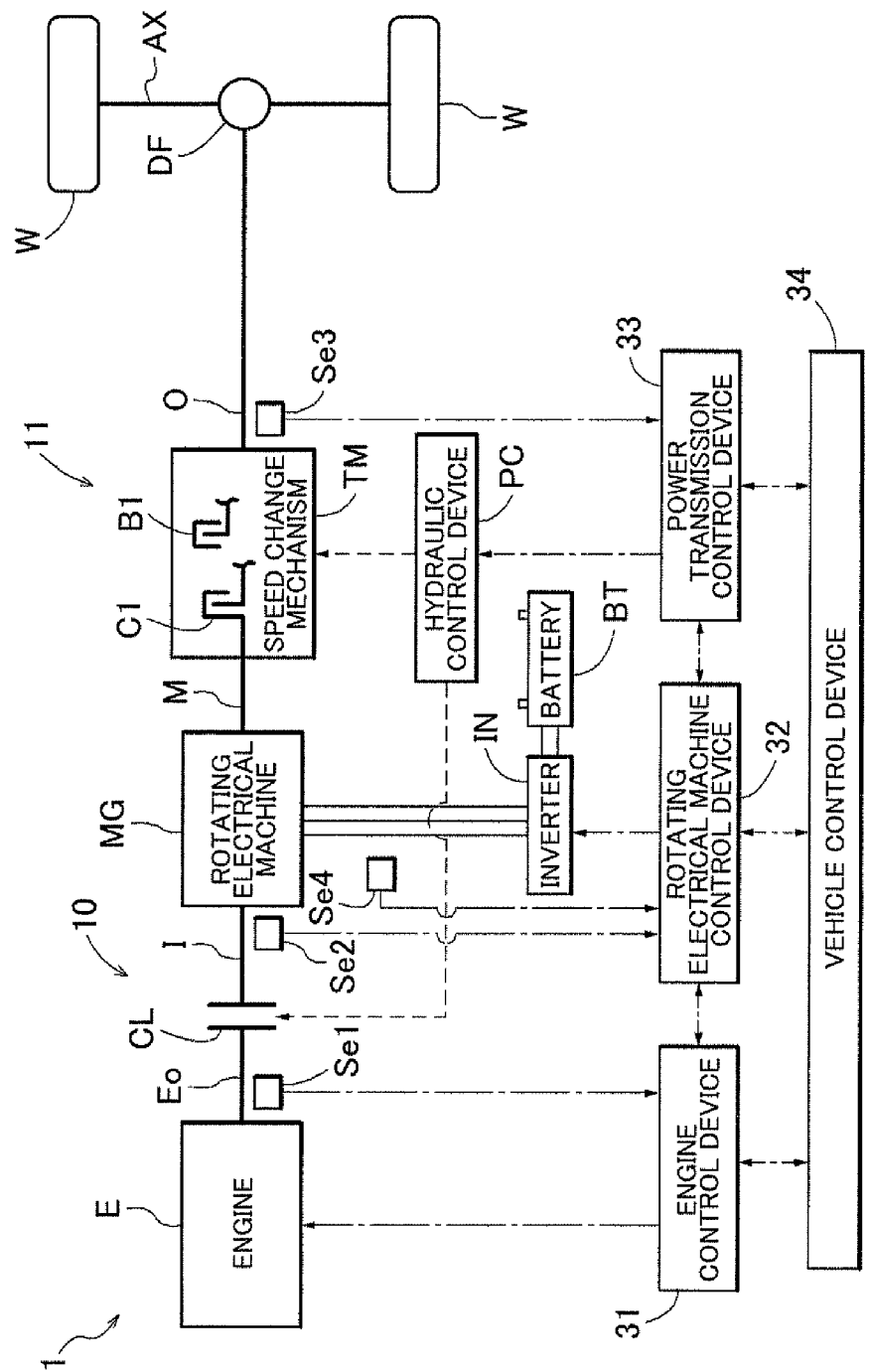
FIG. 1 is a schematic view that shows the schematic configuration of a vehicle driving system and a control device according to an embodiment of the present invention.

An embodiment of a rotating electrical machine control device 32 according to the present invention will be described with reference to the accompanying drawings. FIG. 1 is a schematic view that shows the schematic configuration of a vehicle driving system 1 according to the present embodiment. As shown in the drawing, a vehicle on which the vehicle driving system 1 is mounted is a hybrid vehicle that includes an engine E, which is an internal combustion engine, and a rotating electrical machine MG as driving force sources of the vehicle. In the drawing, the wide solid lines indicate transmission paths of driving force, the dashed lines indicate supply paths of hydraulic fluid, the alternate long and short dashed lines indicate transmission paths of signals, and the narrow solid lines indicate transmission paths of electric power. The rotating electrical machine MG is drivably coupled to the engine E, and is drivably coupled to wheels W. In the present embodiment, the rotating electrical machine MG is drivably coupled to the engine E via a first power transmission mechanism 10, and is drivably coupled to the wheels W via a second power transmission mechanism 11. In the present embodiment, the first power transmission mechanism 10 includes an engine separating clutch CL that allows or disconnects drivable coupling between the rotating electrical machine MG and the engine E, and the second power transmission mechanism 11 includes a speed change mechanism TM.

In addition, the hybrid vehicle includes an engine control device 31 that controls the engine E, the rotating electrical machine control device 32 that controls the rotating electrical machine MG, a power transmission control device 33 that controls the speed change mechanism TM and the engine separating clutch CL, and a vehicle control device 34 that controls the vehicle driving system 1 by consolidating these control devices. The rotating electrical machine control device 32 corresponds to a "control device" in the present invention.

As shown in FIG. 2, the rotating electrical machine control device 32 includes a torque current computing unit 40, an actual current computing unit 41, a current feedback control unit 42, a two-phase/three-phase voltage conversion unit 43 and an inverter control unit 44. The two-phase/three-phase voltage conversion unit 43 and the inverter control unit 44 serve as a voltage control unit 47.

The torque current computing unit 40 computes two-phase current commands Idc, Iqc on the basis of an output torque command value Tmo that the rotating electrical machine MG is caused to output. The two-phase current commands Idc, Iqc express current commands to be flowed through the rotating electrical machine MG in a dq rotating coordinate system. The actual current computing unit 41 computes two-phase actual currents Id, Iq expressed in the dq rotating coordinate system on the basis of actual currents flowing through the rotating electrical machine MG. The current feedback control unit 42 varies two-phase voltage commands Vd, Vq such that the two-phase actual currents Id, Iq approach the two-phase current commands Idc, Iqc. The two-phase voltage commands Vd, Vq express voltage commands to be applied to the rotating electrical machine MG in the dq rotating coordinate system. The two-phase/three-phase voltage conversion unit 43 and the inverter control unit 44 control voltages to be applied to the rotating electrical machine MG on the basis of the two-phase voltage commands Vd, Vq. Here, the dq rotating coordinate system is a rotating coordinate system having two axes formed of a d axis and a q axis that rotate in synchronization with rotation of the rotating electrical machine MG. The dq rotating coordinate system corresponds to a "two-axis rotating coordinate system" in the present invention.

In the above configuration, the output torque command value Tmo includes a fluctuation cancellation torque command Tp that is a torque command for cancelling transmission torque fluctuations Teov that are torque fluctuations transmitted from the engine E to the rotating electrical machine MG. The current feedback control unit 42 has such a feature that the current feedback control unit 42 includes a harmonic controller 45 that calculates the two-phase voltage commands Vd, Vq using the characteristic of a transfer function corresponding to a periodic function of a torque fluctuation frequency ωp that is the frequency of the transmission torque fluctuations Teov. Hereinafter, the rotating electrical machine control device 32 and the vehicle driving system 1 according to the present embodiment will be described in detail.

1. Configuration of Vehicle Driving System

First, the configuration of the vehicle driving system 1 of the hybrid vehicle according to the present embodiment will be described. As shown in FIG. 1, the hybrid vehicle is a parallel-type hybrid vehicle in which the engine E and the rotating electrical machine MG are provided as the driving force sources of the vehicle and these engine E and rotating electrical machine MG are drivably coupled in series with each other. The hybrid vehicle includes the speed change mechanism TM. The speed change mechanism TM shifts the rotation speed, transmitted from the engine E and the rotating electrical machine MG to an intermediate shaft M, and converts torque and outputs the torque to an output shaft O.

The engine E is an internal combustion engine that is driven through combustion of fuel. For example, various known engines, such as a gasoline engine and a diesel engine, may be used as the engine E. In the present embodiment, an engine output shaft Eo, such as a crankshaft of the engine E, is selectively drivably coupled via the engine separating clutch CL to an input shaft I drivably coupled to the rotating electrical machine MG. That is, the engine E is selectively drivably coupled to the rotating electrical machine MG via the engine separating clutch CL that is a friction engagement element. The engine output shaft Eo is drivably coupled to an engagement member of the engine separating clutch CL via a damper (not shown).

The rotating electrical machine MG includes a stator fixed to a non-rotating member and a rotor having a rotary shaft rotatably supported on the radially inner side of the stator. The rotary shaft of the rotor of the rotating electrical machine MG is drivably coupled to the input shaft I and the intermediate shaft M so as to rotate integrally with the input shaft I and the intermediate shaft M. That is, in the present embodiment, both the engine E and the rotating electrical machine MG are drivably coupled to the input shaft I and the intermediate shaft M.

The rotating electrical machine MG is electrically connected to a battery BT, which serves as an electrical storage device, via an inverter IN that carries out direct-current/alternating-current conversion. The rotating electrical machine MG is able to function as a motor (electric motor) that generates power upon reception of electric power supplied and to function as a generator (power generator) that generates electric power upon reception of power supplied. That is, the rotating electrical machine MG performs power running upon reception of electric power supplied from the battery BT via the inverter IN or stores (charges) electric power, generated by rotational driving force that is transmitted from the engine E or the wheels W, in the battery BT via the inverter IN. The battery BT is an example of the electrical storage device. Another electrical storage device, such as a capacitor, may be used as the battery BT or a plurality of types of electrical storage devices may be used in combination. The inverter IN includes a plurality of switching elements for driving the rotating electrical machine MG by converting the direct-current power of the battery BT to alternating-current power or charging the battery BT by converting alternating-current power, generated by the rotating electrical machine MG, to direct-current power.

The rotating electrical machine MG is a synchronous electric motor that operates on three-phase alternating currents. In the present embodiment, the rotating electrical machine MG is a permanent magnet synchronous motor in which a permanent magnet is provided in the rotor and coils are provided in the stator. Instead of the permanent magnet, an electromagnet may be provided.

The speed change mechanism TM is drivably coupled to the intermediate shaft M to which the driving force sources are drivably coupled. In the present embodiment, the speed change mechanism TM is a step-gear automatic transmission that has a plurality of shift speeds having different speed ratios. The speed change mechanism TM includes a gear mechanism, such as a planetary gear mechanism, and a plurality of friction engagement elements B1, C1 in order to establish these plurality of shift speeds. The speed change mechanism TM shifts the rotation speed of the intermediate shaft M and converts torque in accordance with the speed ratio of each shift speed, and transmits the torque to the output shaft O. The torque transmitted from the speed change mechanism TM to the output shaft O is transmitted so as to be distributed to two axles, that is, right and left axles AX via an output differential gear unit DF, and then transmitted to the wheels W drivably coupled to the respective axles AX.

In the present embodiment, the engine separating clutch CL and the plurality of friction engagement elements B1, C1 each are engagement elements, such as clutches and brakes, configured to include friction materials. These friction engagement elements CL, B1, C1 are engaged or disengaged by controlling hydraulic pressures supplied thereto. For example, a multi-plate wet clutch, a multi-plate wet brake, and the like, are suitably used as such friction engagement elements.

2. Configuration of Hydraulic Control System

Next, a hydraulic control system of the vehicle driving system 1 will be described. The hydraulic control system includes a hydraulic control device PC for adjusting the hydraulic pressure of hydraulic fluid, which is supplied from a hydraulic pump, to a predetermined pressure. Although detailed description is omitted here, the hydraulic control device PC adjusts the opening degree of one regulator valve or the opening degrees of two or more regulator valves on the basis of a signal pressure from a hydraulic adjustment linear solenoid valve. Thus, the hydraulic control device PC adjusts the amount of hydraulic fluid that is drained from the regulator valve(s) to thereby adjust the hydraulic pressure of hydraulic fluid to one or two or more predetermined pressures. The hydraulic fluid adjusted to the predetermined pressure is supplied to the speed change mechanism TM, each friction engagement element of the engine separating clutch CL, or the like, at a required hydraulic pressure level.

3. Configuration of Control Devices

Next, the configuration of the control devices 31 to 34 that control the vehicle driving system 1 will be described.

Each of the control devices 31 to 34 includes an arithmetic processing unit, such as a CPU, as a core member, and is configured to include storage devices, such as a random access memory (RAM) configured to allow data to be read and written from the arithmetic processing unit and a read only memory (ROM) configured to allow data to be read from the arithmetic processing unit. The functional units 40 to 44 of the rotating electrical machine control device 32 as shown in FIG. 2 are formed of software (program) stored in the ROMs, or the like, of the control devices, hardware, such as a separately provided computing circuit, or both. The control devices 31 to 34 are configured to communicate with one another, share various pieces of information, such as detected information of sensors and control parameters, and execute cooperative control, thus implementing the functions of the functional units 40 to 44.

The vehicle driving system 1 includes sensors Se1 to Se4. Electrical signals that are output from the sensors are input to the control devices 31 to 34. The control devices 31 to 34 calculate detected information of the sensors on the basis of the input electrical signals. The engine rotation speed sensor Se1 is a sensor for detecting the rotation speed and rotation angle of the engine output shaft Eo (engine E). The engine control device 31 detects the rotation speed (angular velocity) $\omega e$ and rotation angle $\theta e$ of the engine E on the basis of the input signal of the engine rotation speed sensor Se1.

The input shaft rotation speed sensor Se2 is a sensor for detecting the rotation speed and rotation angle of the input shaft I and the intermediate shaft M. Because the rotary shaft of the rotating electrical machine MG is integrally drivably coupled to the input shaft I and the intermediate shaft M, the rotating electrical machine control device 32 detects the rotation speed (angular velocity) corn and rotation angle $\theta m$ of the rotating electrical machine MG (rotor) and the rotation speed of the input shaft and intermediate shaft M on the basis of the input signal of the input shaft rotation speed sensor Se2. The rotating electrical machine control device 32 detects the magnetic pole position $\theta re$ of the rotating electrical machine MG and a magnetic pole rotation speed core on the basis of the input signal of the input shaft rotation speed sensor Se2. The magnetic pole rotation speed core is the rotation speed (angular velocity) of the magnetic pole position $\theta re$. Here, the magnetic pole position $\theta re$ and the magnetic pole rotation speed core are respectively the rotation angle and rotation speed (angular velocity) of the rotor in electric angle. A resolver, a rotary encoder, or the like, is used as the input shaft rotation speed sensor Se2.

The output shaft rotation speed sensor Se3 is a sensor for detecting the rotation speed of the output shaft O. The power transmission control device 33 detects the rotation speed (angular velocity) ωo of the output shaft O on the basis of the input signal of the output shaft rotation speed sensor Se3. The rotation speed of the output shaft O is proportional to a vehicle speed, so the power transmission control device 33 calculates the vehicle speed on the basis of the input signal of the output shaft rotation speed sensor Se3.

The current sensor Se4 is a sensor for detecting currents flowing through phase coils of the rotating electrical machine MG. The rotating electrical machine control device 32 detects actual currents Iu, Iv, Iw flowing through the phase coils on the basis of the input signals of the current sensor Se4.

3-1. Vehicle Control Device

The vehicle control device 34 includes a functional unit that consolidates various torque controls over the engine E, the rotating electrical machine MG, the speed change mechanism TM, the engine separating clutch CL, and the like, engagement control over the friction engagement elements, and the like, in the vehicle as a whole.

The vehicle control device 34 calculates a vehicle required torque that is a target driving force transmitted from the intermediate shaft M side to the output shaft O side on the basis of an accelerator operation amount, a vehicle speed, the amount of charge of the battery, and the like, and determines an operation mode for the engine E and the rotating electrical machine MG. The vehicle control device 34 calculates an engine required torque that is an output torque required of the engine E, a rotating electrical machine required torque that is an output torque required of the rotating electrical machine MG and a target transmission torque capacity of the engine separating clutch CL on the basis of the vehicle required torque, the operation mode, and the like, and executes consolidated control by instructing the other control devices 31 to 33 on those values.

The vehicle control device 34 determines the operation mode for the driving force sources on the basis of the accelerator operation amount, the vehicle speed, the amount of charge of the battery, and the like. In the present embodiment, the operation mode includes an electric mode in which only the rotating electrical machine MG is used as the driving force source, a parallel mode in which at least the engine E is used as the driving force source, an engine power generation mode in which regenerative power generation of the rotating electrical machine MG is carried out by the rotational driving force of the engine E, a regenerative power generation mode in which regenerative power generation of the rotating electrical machine MG is carried out by rotational driving force transmitted from the wheels, and an engine start mode in which the engine E is started by the rotational driving force of the rotating electrical machine MG. Here, the operation modes in which the engine separating clutch CL is engaged include the parallel mode, the engine power generation mode and the engine start mode. Thus, when the operation mode is the parallel mode, the engine power generation mode or the engine start mode, the output torque of the engine E is transmitted to the rotating electrical machine MG via the engine separating clutch CL, so, when a predetermined condition is satisfied, torque fluctuation cancellation control and harmonic control (described later) are executed.

3-2. Engine Control Device

The engine control device 31 includes a functional unit that controls the operation of the engine E. In the present embodiment, when the engine required torque is instructed from the vehicle control device 34, the engine control device 31 sets the engine required torque instructed from the vehicle control device 34 for the output torque command value, and executes torque control such that the engine E outputs the output torque Te of the output torque command value.

3-3. Power Transmission Control Device

The power transmission control device 33 includes a functional unit that controls the speed change mechanism TM and the engine separating clutch CL. Information detected from the sensors, such as the output shaft rotation speed sensor Se3, is input to the power transmission control device 33.

3-3-1. Control over Speed Change Mechanism

The power transmission control device 33 executes control for causing the speed change mechanism TM to establish a shift speed. In the present embodiment, the power transmission control device 33 determines a target shift speed in the speed change mechanism TM on the basis of the sensor detected information, such as the vehicle speed, the accelerator operation amount and a shift position. The power transmission control device 33 engages or disengages the friction engagement elements by controlling the hydraulic pressures that are supplied to the friction engagement elements C1, B1, . . . in the speed change mechanism TM via the hydraulic control device PC. Thus, the power transmission control device 33 causes the speed change mechanism TM to establish the target shift speed.

3-3-2. Control over Engine Separating Clutch

The power transmission control device 33 engages or disengages the engine separating clutch CL. In the present embodiment, the power transmission control device 33 controls the hydraulic pressure that is supplied to the engine separating clutch CL via the hydraulic control device PC such that the transmission torque capacity of the engine separating clutch CL coincides with a target transmission torque capacity instructed from the vehicle control device 34. In the present embodiment, unless otherwise specified, it is assumed that the engine separating clutch CL is engaged.

3-4. Rotating Electrical Machine Control Device

The rotating electrical machine control device 32 is a control device that controls the operation of the rotating electrical machine MG. As shown in FIG. 2, the rotating electrical machine control device 32 includes the functional units, that is, the torque current computing unit 40, the actual current computing unit 41, the current feedback control unit 42, the two-phase/three-phase voltage conversion unit 43 and the inverter control unit 44. The functional units cooperatively execute control such that the rotating electrical machine MG outputs the torque of the output torque command value Tmo.

The output torque command value Tmo is configured to include the fluctuation cancellation torque command Tp that is a torque command for cancelling the transmission torque fluctuations Teov that are torque fluctuations transmitted from the engine E to the rotating electrical machine MG.

In the present embodiment, the rotating electrical machine control device 32 is configured to include a torque fluctuation cancellation control unit 70 that calculates the fluctuation cancellation torque command Tp.

The rotating electrical machine control device 32 sets a base torque command value Tb on the basis of, for example, the rotating electrical machine required torque instructed from the vehicle control device 34. As shown in FIG. 2, the rotating electrical machine control device 32 is configured to set a value, obtained by adding the base torque command value Tb to the fluctuation cancellation torque command Tp calculated by the torque fluctuation cancellation control unit 70, as the output torque command value Tmo. The output torque command value Tmo corresponds to "torque command" in the present invention.

3-4-1. Torque Fluctuation Cancellation Control Unit 70

The torque fluctuation cancellation control unit 70 is a functional unit that executes torque fluctuation cancellation control to calculate the fluctuation cancellation torque command Tp for cancelling the transmission torque fluctuations Teov transmitted from the engine E to the rotating electrical machine MG. Hereinafter, the process of the torque fluctuation cancellation control for calculating the fluctuation cancellation torque command Tp will be described in detail.

3-4-1-1. Torque Fluctuations Transmitted from Engine

Figure 4:
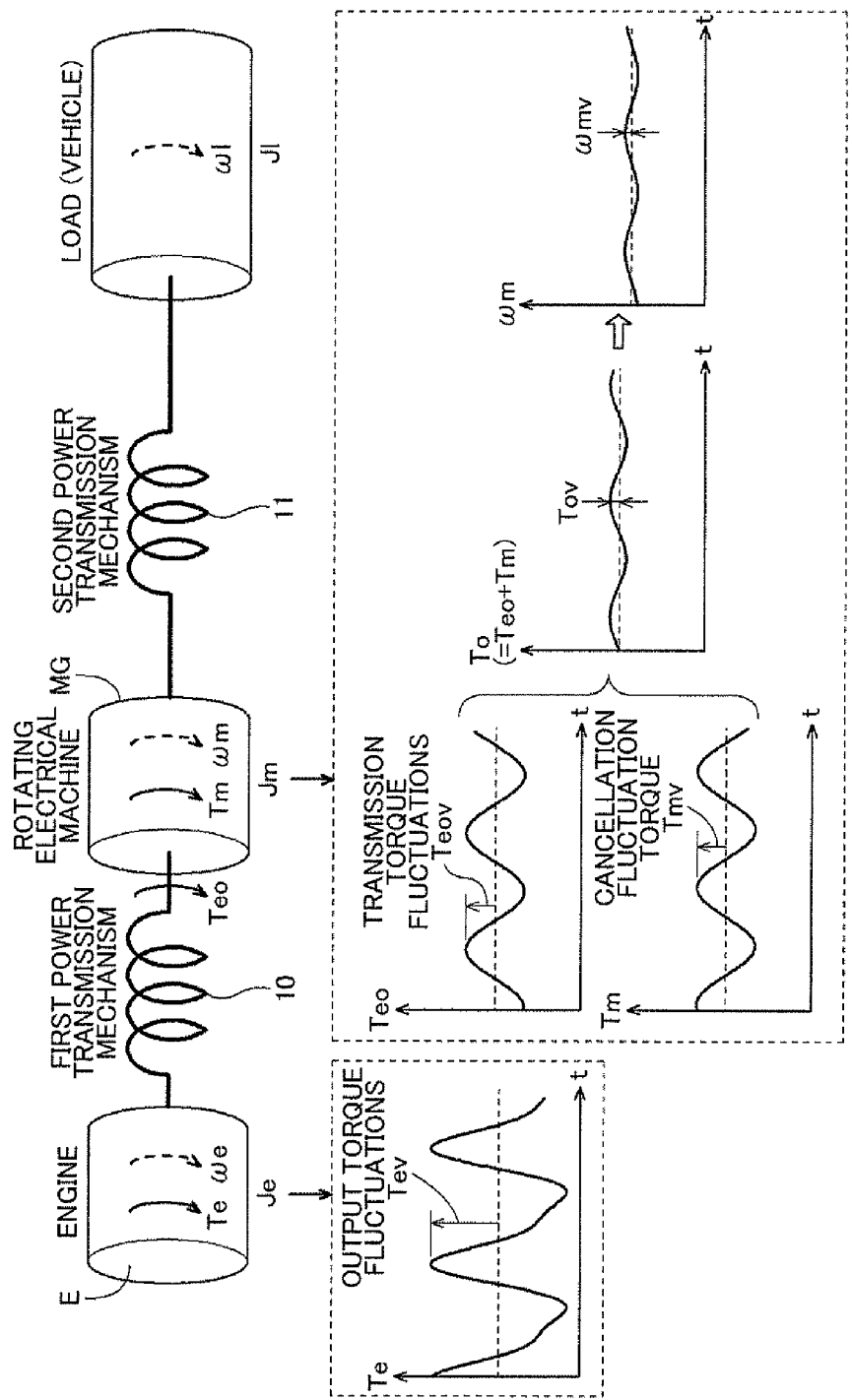
FIG. 4 is a view for illustrating a power transmission model and the process of the control device according to the embodiment of the present invention.

First, the power transmission of the vehicle driving system 1 will be described. FIG. 4 shows power transmission modeled in a three-inertia shaft torsional vibration system. That is, the engine E, the rotating electrical machine MG and the load (vehicle) are respectively modeled as rigid bodies having moments of inertia (inertia) Je, Jm, Jl. In the model, the engine E and the rotating electrical machine MG are coupled by the first power transmission mechanism 10 having elasticity, and the rotating electrical machine MG and the load (vehicle) are coupled by the second power transmission mechanism 11 having elasticity. In the present embodiment, the first power transmission mechanism 10 is formed of members, such as a damper, the engine output shaft Eo and the input shaft I. The first power transmission mechanism 10 has a predetermined torsional spring constant and a viscous friction coefficient, and a shaft torsion occurs in the first power transmission mechanism 10. The second power transmission mechanism 11 is formed of members, such as the intermediate shaft M, the speed change mechanism TM, the output shaft O and the axles AX.

As shown in FIG. 4, output torque fluctuations Tev that correspond to a fluctuation component with respect to the average of the output torque of the engine E are occurring in the output torque Te due to, for example, intermittent combustion of the engine E. The output torque Te of the engine E is transmitted to the rotating electrical machine MG via the first power transmission mechanism 10 as the transmission torque Teo. The transmission torque Teo has the transmission torque fluctuations Teov that correspond to a fluctuation component with respect to the average of the transmission torque Teo due to transmission of the output torque fluctuations Tev. As in the case of the present embodiment, when no torque fluctuation cancellation control is executed, the transmission torque fluctuations Teov are transmitted to the wheel W side, and may cause a driver to feel uncomfortable.

The present embodiment is configured to reduce the torque fluctuations transmitted from the rotating electrical machine MG to the wheel W side by causing the rotating electrical machine MG to output a cancellation fluctuation torque Tmv for cancelling the transmission torque fluctuations Teov through torque fluctuation cancellation control. That is, it is configured to reduce total torque fluctuations Tov that correspond to a fluctuation component in a total torque To of the transmission torque Teo and the output torque Tm of the rotating electrical machine MG through torque fluctuation cancellation control.

The total torque fluctuations Tov cause rotation speed fluctuations comv that correspond to a fluctuation component in the rotation speed com of the rotating electrical machine MG. More specifically, a total of the total torque To and a torque transmitted from the second power transmission mechanism 11 to the rotating electrical machine MG is divided by the moment of inertia Jm of the rotating electrical machine MG, and is then integrated. Thus, the resultant value is the rotation speed (angular velocity) of the rotating electrical machine MG. Thus, the rotation speed com of the rotating electrical machine MG has the rotation speed fluctuations comy that are obtained by dividing the total torque fluctuations Tov by the moment of inertia Jm and then integrating the divided value.

The torque fluctuation cancellation control unit 70 is configured to calculate the fluctuation cancellation torque command Tp on the basis of the rotation speed ωm of the rotating electrical machine MG such that the rotation speed fluctuations ωmv reduce. That is, the torque fluctuation cancellation control unit 70 calculates the fluctuation cancellation torque command Tp such that the cancellation fluctuation torque Tmv becomes a torque that is opposite in phase to the transmission torque fluctuations Teov.

Next, the transmission torque fluctuations Teov transmitted from the engine E to the rotating electrical machine MG via the first power transmission mechanism 10 will be described in more detail.

Figure 5:
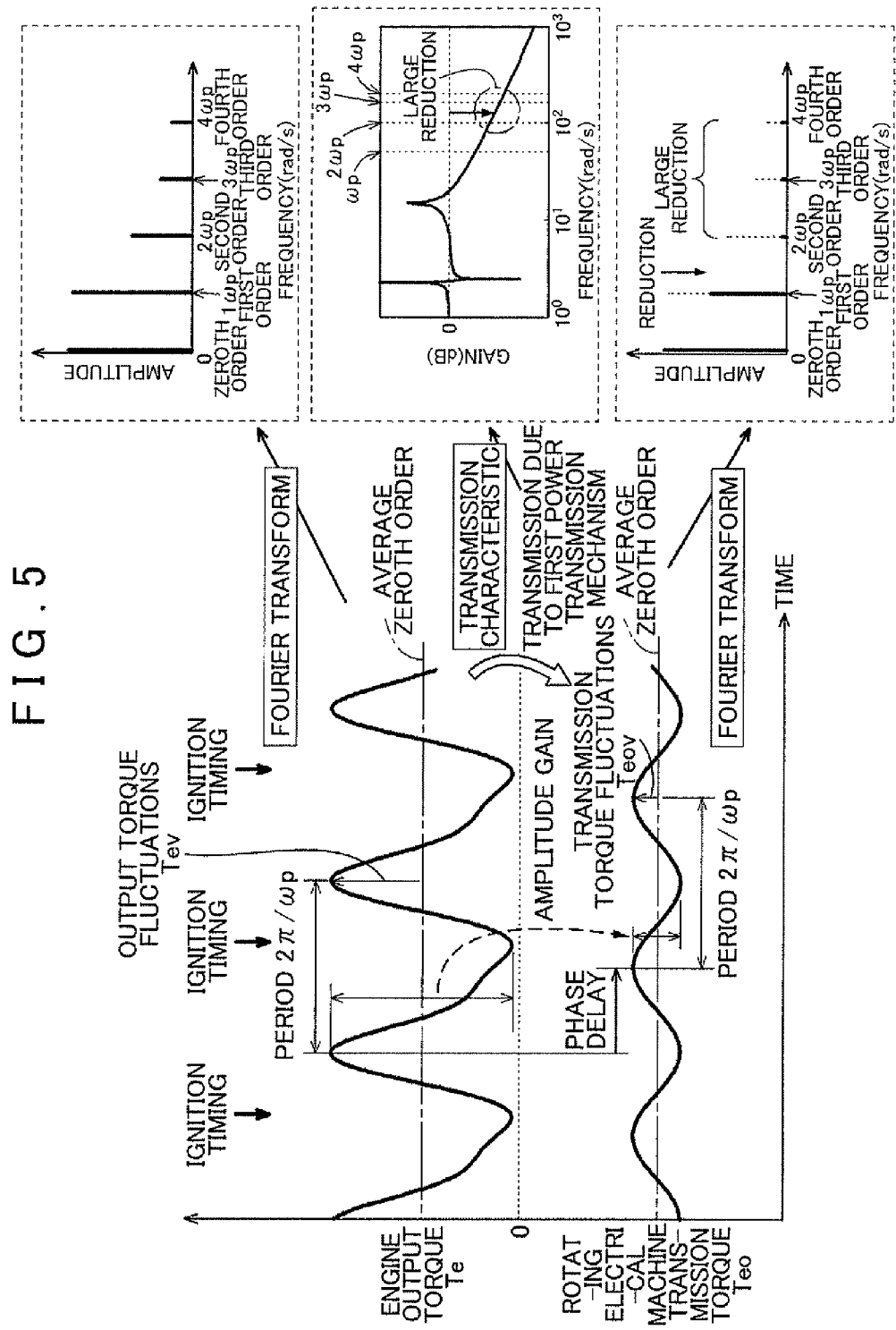
FIG. 5 is a view for illustrating the process of the control device according to the embodiment of the present invention.

As shown in FIG. 5, the output torque Te of the engine E is generated through combustion in a combustion process of the engine E. In the case of a spark-ignition engine, combustion starts after ignition timing. That is, the pressure in a combustion chamber, which has risen through combustion, is transmitted to a crankshaft (engine output shaft Eo) via a piston and a connecting rod in accordance with a geometric relationship, such as a crank angle, and is converted to the output torque Te of the engine E. The output torque Te of the engine E increases after ignition timing, and reduces as the piston approaches its bottom dead center. Thus, the output torque Te of the engine E fluctuates periodically in the same phase in rotation as shown in FIG. 5. The torque fluctuation frequency ωp (angular frequency) of the output torque Te of the engine E varies with the rotation speed ωe of the engine E. In a four-cycle engine having N cylinders, $\omega p = N/2 \times \omega e$. In a four-cylinder engine, $\omega p = 2 \times \omega e$. In a compression ignition engine, such as a diesel engine, ignition timing, that is, combustion start timing, may be regarded as fuel injection timing into a combustion chamber.

When a Fourier transform is performed on the output torque Te of the engine E, amplitudes of zeroth-order (0), first-order (ωp), second-order (2ωp), third-order (3ωp), fourth-order (4ωp) frequency components are obtained for the torque fluctuation frequency ωp. The amplitude of the zeroth-order frequency component through the Fourier transform corresponds to the average of the output torque Te of the engine E. The amplitude of the first-order frequency component through the Fourier transform substantially corresponds to the output torque fluctuations Tev. The amplitude of each of the second or higher-order frequency component through the Fourier transform is smaller than the amplitude of the first-order frequency component, and the amplitude reduces as the order becomes higher.

The output torque Te of the engine E fluctuates to near zero, so the amplitude of the output torque fluctuations Tev is large. The amplitude of the output torque fluctuations Tev increases substantially in proportion to an increase in the average of the output torque Te of the engine E. Hereinafter, the output torque Te of the engine E indicates the average of the fluctuating torque unless otherwise specified.

This fluctuating output torque Te of the engine E is transmitted to the rotating electrical machine MG via the first power transmission mechanism 10, and becomes the transmission torque Teo. In the torque transmission characteristic of the first power transmission mechanism 10, within the band of the torque fluctuation frequency ωp corresponding to an operating range of the rotation speed ωe of the engine E, as in an example of the Bode diagram of the torque transmission characteristic, shown in FIG. 5, the gain reduces to below 0 dB as the torque fluctuation frequency ωp increases. For example, within the band of the torque fluctuation frequency ωp, the gain reduces at about −40 dB/dec. Thus, as shown in the example of the Bode diagram of FIG. 5, the gain of the first-order frequency component also reduces to below 0 dB, and a reduction in the gain of the second or higher-order frequency component is larger than a reduction in the first-order frequency component. The reduction in the gain of the second or higher-order is indicated by dB, so the reduction is exponential, and the amount of reduction is large. The gain of the zeroth-order frequency component is 0 dB, so the average of the output torque Te of the engine E directly becomes the average of the output torque fluctuations Tev without reduction.

Thus, the amplitude of the second or higher-order fluctuation component in the output torque fluctuations Tev significantly reduces as compared to a reduction in the amplitude in the first-order fluctuation component due to the transmission characteristic of the first power transmission mechanism 10, and is then transmitted to the rotating electrical machine MG. Thus, as shown in FIG. 5, in the transmission torque fluctuations Teov in the transmission torque Teo, the amplitude of the second or higher-order fluctuation component is significantly reduced, and approaches to the first-order fluctuation component. The amplitude of the first-order fluctuation component also reduces. Thus, the transmission torque fluctuations Teov may be approximated by the first-order fluctuation component of the torque fluctuation frequency ωp, that is, the sinusoidal wave (or cosinusoidal wave) of the torque fluctuation frequency (angular frequency) ωp as expressed by the following mathematical expression.

$$Teov(t) = \Delta Teov \sin(\omega pt) \quad (1)$$

Here, ΔTeov is the amplitude of the transmission torque fluctuations Teov. The transmission torque fluctuations Teov have a delay in phase of about −180 deg to −160 deg with respect to the output torque fluctuations Tev due to the transmission characteristic of the first power transmission mechanism 10.

As shown in the Bode diagram of FIG. 5, it appears that, in the torque transmission characteristic of the first power transmission mechanism 10, the gain decreases in proportion to the torque fluctuation frequency ωp, that is, the rotation speed ωe of the engine E. Thus, at a low rotation speed ωe (for example, 1,000 rpm), a reduction in the gain reduces, and the amplitude ΔTeov of the transmission torque fluctuations increases. As the average of the output torque Te of the engine E increases, the amplitude of the output torque fluctuations Tev in the output torque Te, and the amplitude of the transmission torque fluctuations increases even at the same gain (rotation speed).

Figure 6:
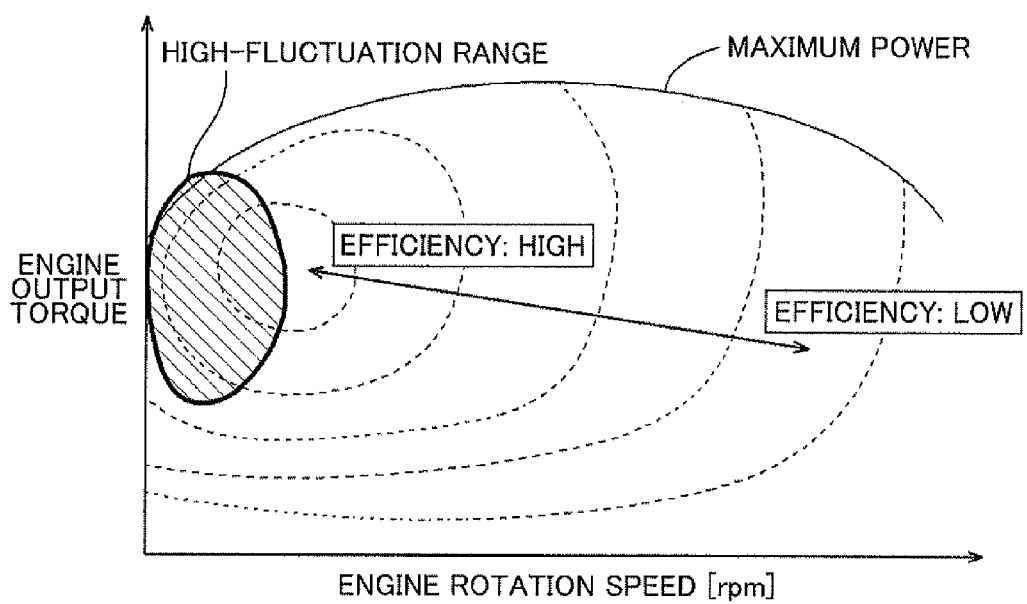
FIG. 6 is a view for illustrating the process of the control device according to the embodiment of the present invention.

Thus, as shown in FIG. 6, a range in which the rotation speed ωe is low and the output torque Te is high becomes a high-fluctuation range in which the transmission torque fluctuations Teov increase to the level at which the driver is caused to feel uncomfortable. The high-fluctuation range overlaps with a high-efficiency range in which the thermal efficiency of the engine E rises as shown in FIG. 6. In the case where no torque fluctuation cancellation control is executed, it is required to operate the engine E while avoiding the high-fluctuation range, and there may be a case where the high-efficiency range of the engine E cannot be used. Therefore, in the control device according to the present embodiment, torque fluctuation cancellation control is executed, and the transmission torque fluctuations Teov are cancelled to allow the high-fluctuation range to be used.

3-4-1-2. Fluctuation Cancellation Torque Command Tp

In order to cancel the transmission torque fluctuations Teov that can be approximated by the first-order fluctuation component of the torque fluctuation frequency ωp, it appears that torque fluctuations having the phase opposite to that of the transmission torque fluctuations Teov of the mathematical expression (1), that is, the torque fluctuations that are advanced or delayed in phase by π (180 deg), just need to be output to the rotating electrical machine MG.

Thus, the fluctuation cancellation torque command Tp calculated by the torque fluctuation cancellation control unit 70 is approximate to the first-order fluctuation component of the torque fluctuation frequency ωp, that is, the sinusoidal wave (or cosinusoidal wave) of the torque fluctuation frequency ωp as expressed by the following mathematical expression.

$$Tp(t) = \Delta Tp \sin(\omega pt) \quad (2)$$

Here, ΔTp is the amplitude of the fluctuation cancellation torque command Tp, and ωp is the fluctuation frequency of the fluctuation cancellation torque command Tp.

In the present embodiment, the torque fluctuation cancellation control unit 70 is configured to execute rotation feedback control for changing the fluctuation cancellation torque command Tp on the basis of the rotation speed ωm of the rotating electrical machine MG such that the rotation speed fluctuations ωmy of the rotation speed ωm reduce. As a result of the rotation feedback control, the fluctuation cancellation torque command Tp becomes the sinusoidal wave (or cosinusoidal wave) of the torque fluctuation frequency ωp or approximate to the wave as expressed by the mathematical expression (2).

In the present embodiment, the torque fluctuation cancellation control unit 70 is configured to determine to execute torque fluctuation cancellation control when an operating condition of the rotation speed ωe of the engine E and the engine required torque falls within a predetermined cancellation control execution range as in the case of the high-fluctuation range shown in FIG. 6, and to determine not to execute torque fluctuation cancellation control when the operating condition does not fall within the cancellation control execution range.

The torque fluctuation cancellation control unit 70 calculates the fluctuation cancellation torque command Tp when the torque fluctuation cancellation control unit 70 has determined to execute torque fluctuation cancellation control, and sets the fluctuation cancellation torque command Tp to 0 when the torque fluctuation cancellation control unit 70 has determined not to execute torque fluctuation cancellation control.

For example, when a reduction in the amplitude from the output torque fluctuations Tev to the transmission torque fluctuations Teov through the first power transmission mechanism 10 is small, the second and higher-order fluctuation components of the torque fluctuation frequency ωp in the transmission torque fluctuations Teov may not sufficiently reduce. In this case, it may be configured such that the fluctuation components of the frequencies that are twice or more of the torque fluctuation frequency ωp are added to the fluctuation cancellation torque command Tp as expressed by the following mathematical expression.

$$Tp(t) = \Delta Tp \sin(\omega pt) + \Delta Tp2 \sin(2\omega pt) + \Delta Tp3 \sin(3\omega pt) + \quad (3)$$

3-4-2. Torque Control and Current Feedback Control

In the present embodiment, as shown in FIG. 2, the rotating electrical machine control device 32 sets a value obtained by adding the base torque command value Tb to the fluctuation cancellation torque command Tp as the output torque command value Tmo. The functional units 40 to 44 of the rotating electrical machine control device 32 are configured to cooperatively execute torque control for causing the rotating electrical machine MG to output the torque of the output torque command value Tmo.

At this time, the rotating electrical machine control device 32 is configured to control the rotating electrical machine MG through current feedback control using a vector control method by calculating current commands on the basis of the output torque command value Tmo. In vector control, the d axis is set to the direction (magnetic pole position) of each N pole of the magnet provided in the rotor, the q axis is set to a direction advanced by $\pi/2$ in electric angle from the d axis, and the dq rotating coordinate system formed of the d axis and the q axis that rotate in synchronization with rotation of the rotor in electric angle is set. Here, with reference to the U-phase coil, the lead angle (electric angle) of the d axis (magnetic pole position) is defined as the magnetic pole position $\theta$re. In vector control, the current commands are set in the dq rotating coordinate system, the actual currents Iu, Iv, Iw flowing through the phase coils are converted to the two-phase actual currents Id, Iq expressed in the dq rotating coordinate system on the basis of the magnetic pole position $\theta$re, and current feedback control is executed to control voltages to be applied to the rotating electrical machine MG such that the two-phase actual currents Id, Iq approach the current commands. Hereinafter, torque control and current feedback control according to the present embodiment will be described in detail.

3-4-2-1. Torque Current Computing Unit 40

The torque current computing unit 40 is a functional unit that computes the two-phase current commands Idc, Iqc that express the current commands to be flowed through the rotating electrical machine MG in the dq rotating coordinate system on the basis of the output torque command value Tmo that the rotating electrical machine MG is caused to output.

Figure 7A:
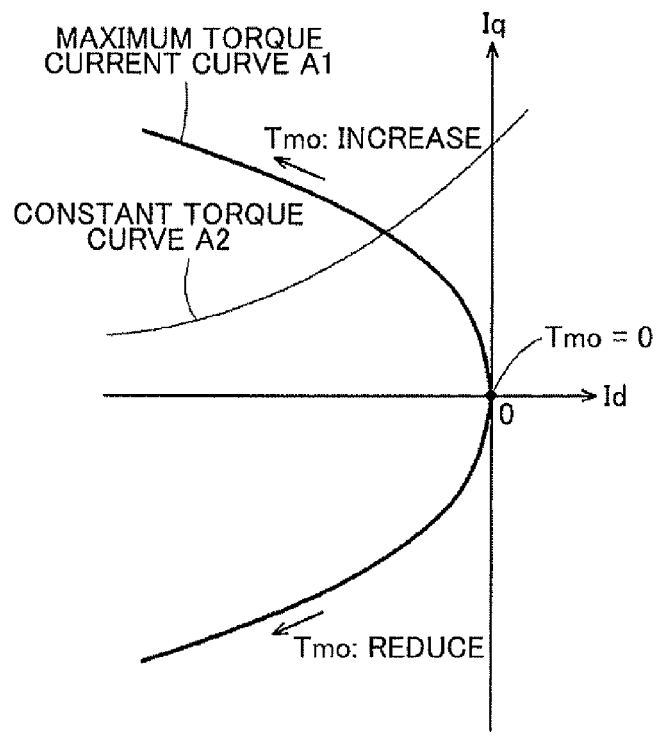
FIG. 7A, FIG. 7B, and FIG. 7C are views for illustrating the process of the control device according to the embodiment of the present invention.

In the present embodiment, the torque current computing unit 40 is configured to calculate the d-axis two-phase current command Idc and the q-axis two-phase current command Iqc for causing the rotating electrical machine MG to output the torque of the output torque command value Tmo. In FIG. 7A, as shown in a constant torque curve A2, there are infinite combinations of the d-axis two-phase current command Idc and the q-axis two-phase current command Iqc for causing the rotating electrical machine MG to output the same torque. The torque current computing unit 40 computes the two-phase current commands Idc, Iqc on the basis of a control method, such as Id=0 control, maximum torque current control, maximum torque magnetic flux control and flux weakening control. The Id=0 control is a control method in which the d-axis two-phase current command Idc is set to 0 and the q-axis two-phase current command Iqc is varied on the basis of the output torque command value Tmo. The maximum torque current control is a control method in which the two-phase current commands Idc, Iqc that maximize a generated torque for the same currents are calculated. The maximum torque magnetic flux control is a control method in which the two-phase current commands Idc, Iqc are calculated such that a flux linkage is minimum at the time when the same torque is generated. The flux weakening control is a control method in which the two-phase current commands Idc, Iqc are calculated such that magnetic fluxes in the d-axis direction are reduced by utilizing demagnetization effect due to a d-axis armature reaction as a result of flowing a negative d-axis current.

The two-phase current commands Idc, Iqc are determined in a curve that is set in consideration of each control method, for example, in a maximum torque current curve A1 shown in FIG. 7A. Here, the maximum torque current curve A1 is a curve formed by connecting values that can be taken by the two-phase actual currents Id, Iq at the time when maximum torque current control is executed. When the control mode (current control mode) is changed due to, for example, a change of the operating condition, the two-phase current commands Idc, Iqc are determined in a curve corresponding to each control method (current control mode). Hereinafter, description will be made on an example in which maximum torque current control is executed.

Figure 7B:
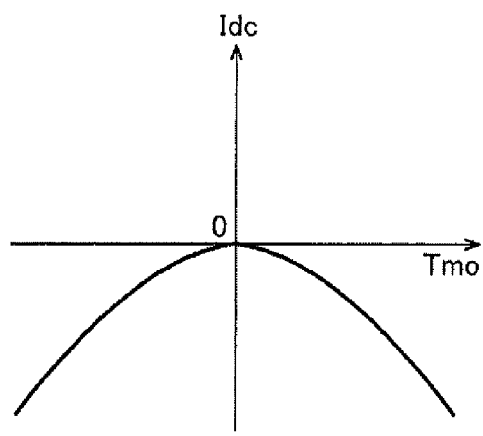
Figure 7C:
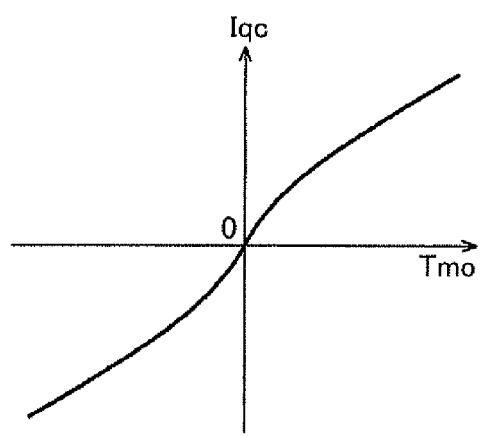

As shown in FIG. 7A, the torque current computing unit 40 increases the q-axis two-phase current command Iq from 0 and reduces the d-axis two-phase current command Idc from 0 along the maximum torque current curve A1 with an increase in the output torque command value Tmo from 0. On the other hand, the torque current computing unit 40 reduces the q-axis two-phase current command Iqc from 0 and reduces the d-axis two-phase current command Idc from 0 along the maximum torque current curve A1 with a reduction in the output torque command value Tmo from 0. As shown by the relationship characteristics of the current commands Idc, Iqc with the output torque command value Tmo in FIG. 7B and FIG. 7C, the q-axis two-phase current command Iqc is calculated so as to monotonously increase with an increase in the output torque command value Tmo. On the other hand, the d-axis two-phase current command Idc is calculated so as to monotonously increase with an increase in the output torque command value Tmo when the output torque command value Tmo is smaller than 0, and is calculated so as to monotonously reduce with an increase in the output torque command value Tmo when the output torque command value Tmo is larger than 0. The relationship characteristics of the current commands Idc, Iqc with the output torque command value Tmo form curves, and provide a high-order function higher than a first-order function.

Figure 8:
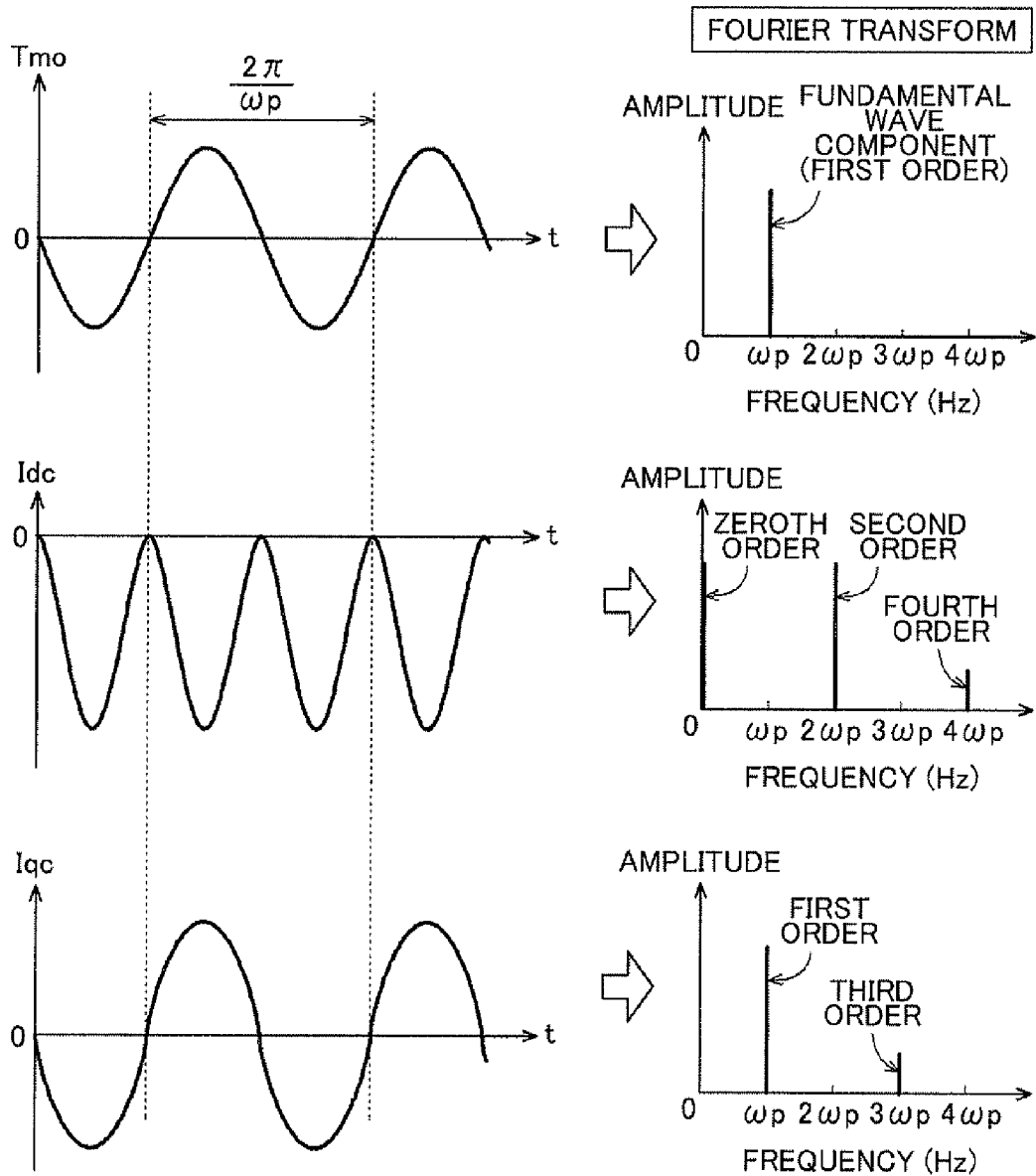
FIG. 8 is a view for illustrating the process of the control device according to the embodiment of the present invention.

Particularly, as in the case where torque fluctuation cancellation control is executed in a state where the rotating electrical machine required torque (base torque command value Tb) is set to 0, when the output torque command value Tmo fluctuates across 0, the d-axis two-phase current command Idc fluctuates at the frequency that is twice the fluctuation frequency of the output torque command value Tmo (torque fluctuation frequency $\omega$p) as shown at the left side in FIG. 8. On the other hand, the q-axis two-phase current command Iqc fluctuates at the same frequency as the fluctuation frequency of the output torque command value Tmo (torque fluctuation frequency $\omega$p).

Therefore, as shown at the right side in FIG. 8 by the frequency characteristics obtained by performing a Fourier transform on each waveform, the output torque command value Tmo has the amplitude of the component (fundamental wave component, first-order) of the torque fluctuation frequency $\omega$p of the fluctuation cancellation torque command Tp; whereas the d-axis two-phase current command Idc has the amplitude of the second-order ($2\omega$p) frequency component for the torque fluctuation frequency $\omega$p. The q-axis two-phase current command Iqc has the amplitude of the first-order ($\omega$p) frequency component that is the same as the torque fluctuation frequency $\omega$p of the fluctuation cancellation torque command Tp.

The relationship characteristics of the current commands Idc, Iqc with the output torque command value Tmo provide a high-order function higher than a first-order function, so the d-axis two-phase current command Idc has the amplitude of the fourth-order ($4\omega$p) frequency component. The q-axis two-phase current command Iqc has the amplitude of the third-order (3ωp) frequency component. In the relationship characteristics of the current commands Idc, Iqc with the output torque command value Tmo, such second or higher-order (a natural number multiple of two or larger of the torque fluctuation frequency ωp) frequency components in the two-phase current commands Idc, Iqc increase as higher-order function components increase.

As expressed in the mathematical expression (3), when the fluctuation component having a frequency that is twice or more of the torque fluctuation frequency ωp (second or higher order) is added to the fluctuation cancellation torque command Tp as well, the two-phase current commands Idc, Iqc each have the amplitude of the component having a frequency that is twice or more of the torque fluctuation frequency ωp (second or higher order).

Figure 9:
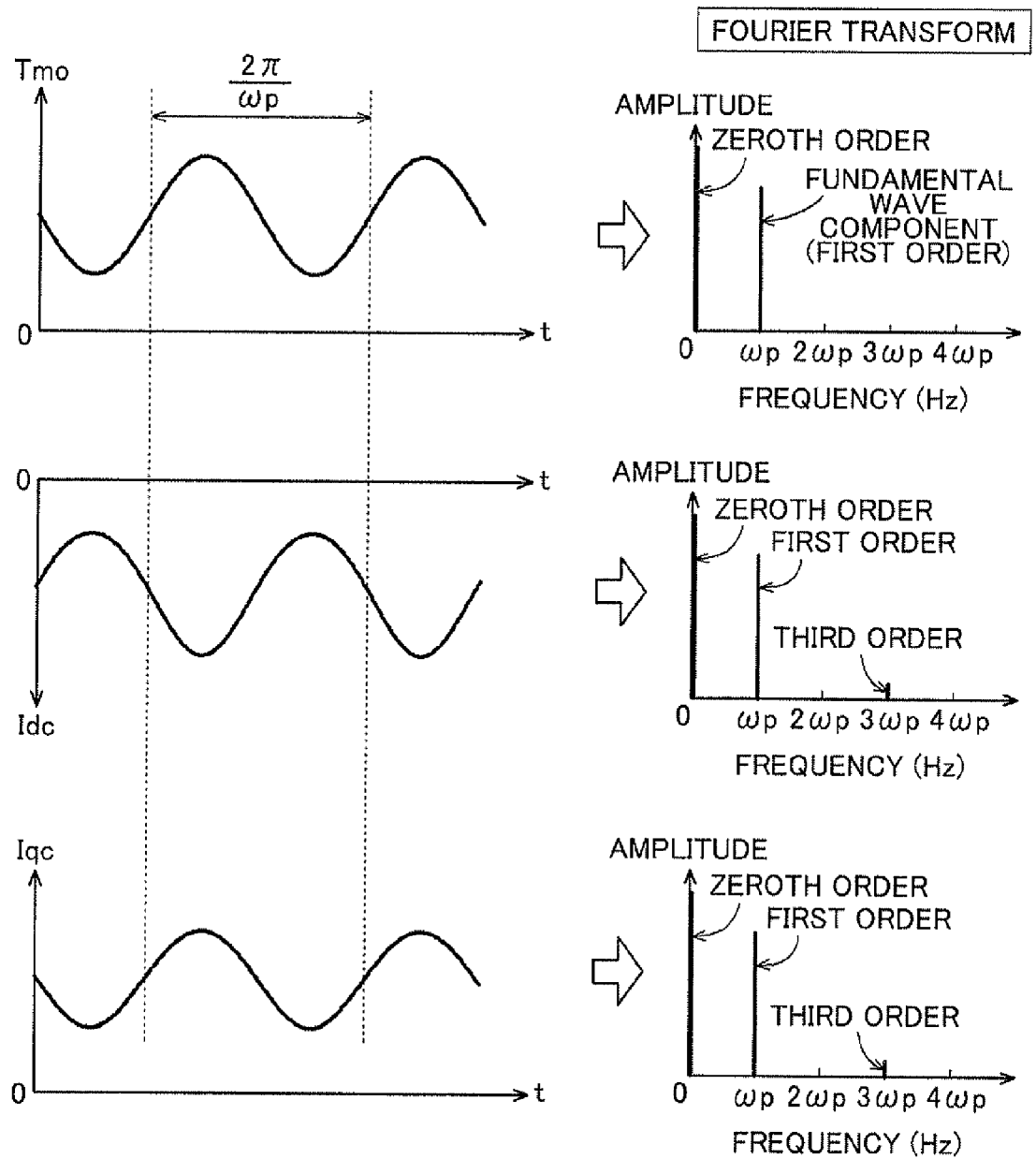
FIG. 9 is a view for illustrating the process of the control device according to the embodiment of the present invention.

On the other hand, as in the case where torque fluctuation cancellation control is executed in a state where the rotating electrical machine required torque (base torque command value Tb) is set so as to be larger than or smaller than 0, when the output torque command value Tmo fluctuates not across 0, the d-axis two-phase current command Idc and the q-axis two-phase current command Iqc fluctuate at the same frequency as the fluctuation frequency of the output torque command value Tmo (torque fluctuation frequency ωp) as shown at the left side in FIG. 9.

Therefore, as shown at the right side in FIG. 9 by the frequency characteristics obtained by performing a Fourier transform on each waveform, the d-axis two-phase current command Idc and the q-axis two-phase current command Iqc each have the amplitude of the first-order (ωw) frequency component that is the same as the torque fluctuation frequency ωp of the fluctuation cancellation torque command Tp. The relationship characteristics of the current commands Idc, Iqc with the output torque command value Tmo provide a high-order function higher than a first-order function, so the d-axis two-phase current command Idc and the q-axis two-phase current command Iqc each have the amplitude of the third-order (3ωp) frequency component.

3-4-2-2. Actual Current Computing Unit 41

As shown in FIG. 2, the actual current computing unit 41 is a functional unit that computes the two-phase actual currents Id, Iq expressed in the dq rotating coordinate system on the basis of actual currents flowing through the rotating electrical machine MG. In the present embodiment, the actual current computing unit 41 converts the actual currents Iu, Iv, Iw flowing through the phase coils to the d-axis two-phase actual current Id and the q-axis two-phase actual current Iq expressed in the dq rotating coordinate system through three-phase/two-phase conversion and rotating coordinate conversion on the basis of the magnetic pole position θre.

3-4-2-3. Current Feedback Control Unit 42

The current feedback control unit 42 is a functional unit that varies the two-phase voltage commands Vd, Vq that express the voltage commands to be applied to the rotating electrical machine MG in the dq rotating coordinate system such that the two-phase actual currents Id, Iq approach the two-phase current commands Idc, Iqc.

The current feedback control unit 42 includes the harmonic controller 45. The harmonic controller 45 calculates harmonic two-phase voltage commands Vhd, Vhq using the characteristic of the transfer function corresponding to the periodic function of the torque fluctuation frequency ωp that is the frequency of the transmission torque fluctuations Teov.

In the present embodiment, the harmonic controller 45 is configured to calculate the harmonic two-phase voltage commands Vhd, Vhq using a harmonic model having the characteristic of the transfer function corresponding to the sinusoidal wave or cosinusoidal wave of the torque fluctuation frequency ωp. Here, the harmonic model corresponds to an "operator" in the present invention.

In the present embodiment, the harmonic controller 45 includes a d-axis harmonic controller 50 for a d-axis current and a q-axis harmonic controller 51 for a q-axis current. In the present embodiment, the current feedback control unit 42 also includes a fundamental controller 46 that calculates fundamental two-phase voltage commands Vbd, Vbq. The fundamental controller 46 includes a d-axis fundamental controller 52 for the d-axis current and a q-axis fundamental controller 53 for the q-axis current.

The current feedback control unit 42 is configured to set a value obtained by adding the d-axis harmonic two-phase voltage command Vhd to the d-axis fundamental two-phase voltage command Vbd as the d-axis two-phase voltage command Vd and to set a value obtained by adding the q-axis harmonic two-phase voltage command Vhq to the q-axis fundamental two-phase voltage command Vbq as the q-axis two-phase voltage command Vq.

3-4-2-3-1. Fundamental Controller 46

Figure 3:
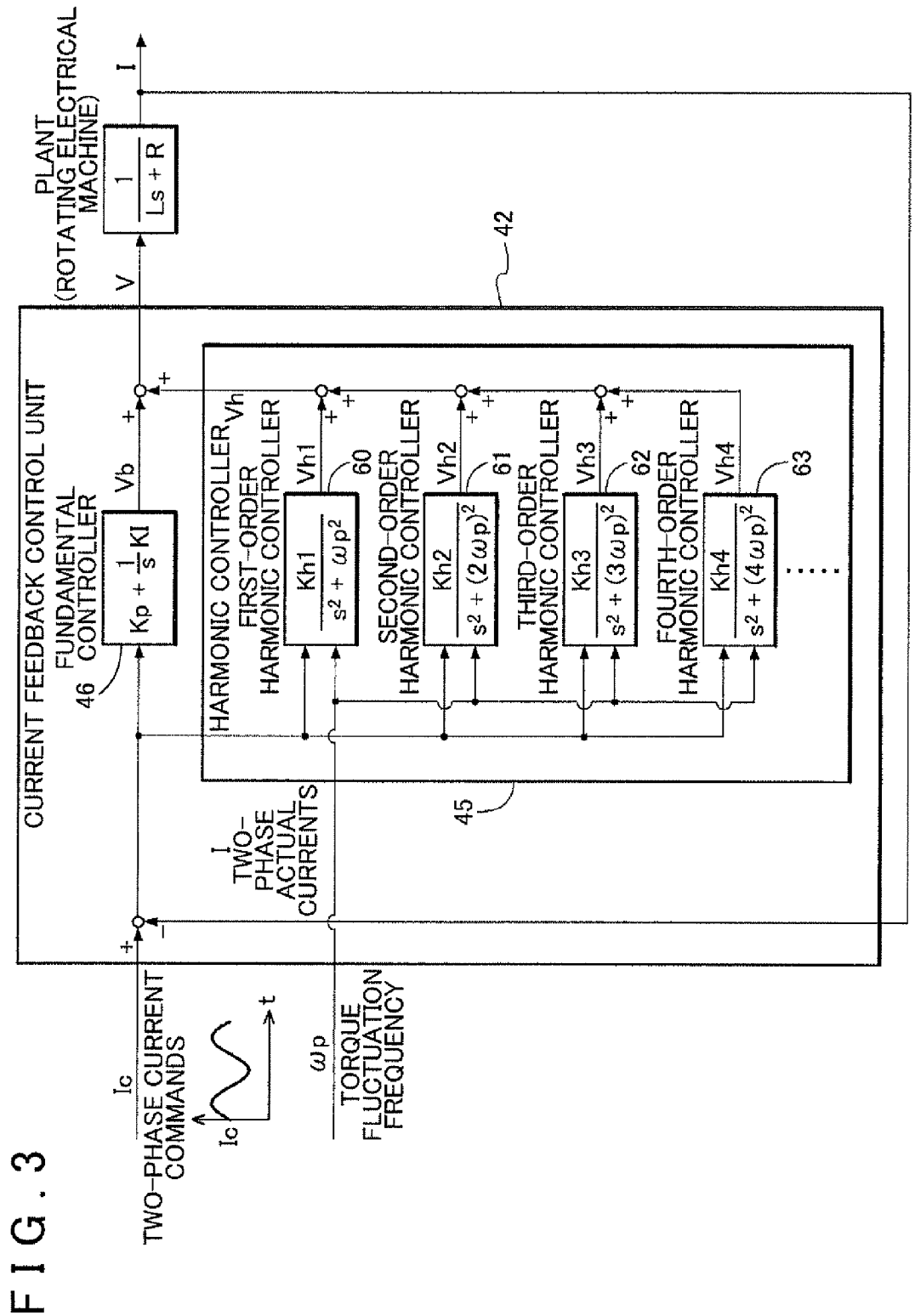
FIG. 3 is a block diagram that shows the configuration of the control device according to the embodiment of the present invention.

In the present embodiment, as shown in FIG. 3 and the following mathematical expression, the fundamental controller 46 is a proportional-plus-integral (PI) controller that calculates the fundamental two-phase voltage commands Vbd, Vbq through proportional computation and integral computation on the basis of current deviations between the two-phase actual currents Id, Iq and the two-phase current commands Idc, Iqc.

$$Vbd = \left(Kpd + Kid\frac{1}{s}\right)(Idc - Id) \qquad (4)$$

$$Vbq = \left(Kpq + Kiq\frac{1}{s}\right)(Iqc - Iq)$$

Here, Kpd is a d-axis proportional gain, Kpq is a q-axis proportional gain, Kid is a d-axis integral gain, and Kiq is a q-axis integral gain. Here, the gains may be set to satisfy the relationship as expressed by the following mathematical expression.

$$\frac{Kpd}{Kid} = \frac{Ld}{R}, \quad \frac{Kpq}{Kiq} = \frac{Lq}{R} \qquad (5)$$

Here, Ld is a d-axis inductance, and Lq is a q-axis inductance.

The fundamental controller 46 may be a controller other than the proportional-plus-integral (PI) controller, and may be, for example, a proportional-plus-integral-plus-derivative (ND) controller. The fundamental controller 46 may additionally include a noninteracting unit as expressed by the following mathematical expression. In this case, calculated values ΔVbd, ΔVbq of the noninteracting unit are additionally added to the fundamental two-phase voltage commands Vbd, Vbq.

$$\begin{bmatrix} \Delta Vbd \\ \Delta Vbq \end{bmatrix} = \begin{bmatrix} -\omega re LqIq \\ \omega re(LdId + \Phi) \end{bmatrix} \qquad (6)$$

Here, Φ is a flux linkage due to the magnet.

3-4-2-3-2. Harmonic Controller 45
<Tracking Error with Respect to Periodic Fluctuation Component>

The transfer function that expresses the response of each of the two-phase actual currents Id, Iq flowing through the rotating electrical machine MG to a corresponding one of the two-phase voltage commands Vd, Vq is expressed in first-order lag as shown in FIG. 3 and the following mathematical expression.

$$Id = \frac{1}{Lds + R}Vd, \quad Iq = \frac{1}{Lqs + R}Vq \tag{7}$$

When the two-phase current commands Idc, Iqc each do not include a periodic fluctuation component, even only the fundamental controller 46 like the proportional-plus-integral controller is able to cause the two-phase actual currents Id, Iq to track the two-phase current commands Idc, Iqc without steady state deviations.

However, the two-phase current commands Idc, Iqc each include the periodic fluctuation component that is 1 to n times (n is a natural number larger than or equal to 2) the torque fluctuation frequency ωp due to the fluctuation component of the torque fluctuation frequency ωp of the fluctuation cancellation torque command Tp.

In this case, with only the fundamental controller 46 like the proportional-plus-integral controller, the two-phase actual currents Id, Iq track the periodic fluctuation components of the two-phase current commands Idc, Iqc with a phase delay, and there occur steady state deviations. For example, as shown in the timing diagram of FIG. 12, in a period up to time t11, the two-phase voltage commands are calculated with the use of only the fundamental controller 46 formed of the proportional-plus-integral controller. In this period, the two-phase actual currents I track the periodically fluctuating two-phase current commands Ic with a phase delay and a gain decrease, and have steady state deviations.

<Internal Model Principle>

In order to track the command values without steady state deviations, a control theory of an internal model principle in which it is effective to introduce a controller having the same poles as the poles of the command values into the inside of a feedback system is used.

The two-phase current commands Idc, Iqc each include the sinusoidal (or cosinusoidal) periodic fluctuation component having a frequency that is 1 to n times (n is a natural number larger than or equal to 2) the torque fluctuation frequency ωp expressed by the following mathematical expression.

$$Ic(t) = a_0 + a_1 \sin(\omega pt) + a_2 \sin(2\omega pt) + a_3 \sin(3\omega pt) + a_4 \sin(4\omega pt) \tag{8}$$
$$= \sum_{n=0} a_n \sin(n\omega pt)$$

When the two-phase current commands Idc, Iqc in the mathematical expression (8) each are expressed by a transfer function, the following mathematical expression is obtained.

$$Ic(s) = a_0 \frac{1}{s} + a_1 \frac{\omega p}{s^2 + \omega p^2} + a_2 \frac{2\omega p}{s^2 + (2\omega p)^2} + a_3 \frac{3\omega p}{s^2 + (3\omega p)^2} + \tag{9}$$

$$a_4 \frac{4\omega p}{s^2 + (4\omega p)^2}$$
$$= a_0 \frac{1}{s} + \sum_{n=1} a_n \frac{n\omega p}{s^2 + (n\omega p)^2}$$

When the two-phase current commands Idc, Iqc are cosinusoidal waves, each of them is expressed by the transfer function in the following mathematical expression.

$$Ic(s) = a_0 \frac{1}{s} + \sum_{n=1} a_n \frac{s}{s^2 + (n\omega p)^2} \tag{10}$$

From the mathematical expression (8) and the mathematical expression (9), the poles of each of the two-phase current commands Idc, Iqc, that is, s at which the denominator of the transfer function is 0, is as follows.

$$s = 0, \pm j(n\omega p)(n = 1, 2, 3 \ldots) \tag{11}$$

Thus, through the internal model principle, the transfer function Gfb of the current feedback control unit 42 is able to track each of the command values without a steady state deviation when the transfer function Gfb is configured to have the poles of the mathematical expression (11) as expressed by the following mathematical expression.

$$Gfb(s) = \frac{b_0}{s} + \frac{B_1(s)}{s^2 + \omega p^2} + \frac{B_2(s)}{s^2 + (2\omega p)^2} + \frac{B_3(s)}{s^2 + (3\omega p)^2} + \frac{B_4(s)}{s^2 + (4\omega p)^2} \tag{12}$$
$$= \frac{b_0}{s} + \sum_{n=1} \frac{B_n(s)}{s^2 + (n\omega p)^2}$$

The first term on the right-hand side of the mathematical expression (12) is included as integral computation of the fundamental controller 46 (proportional-plus-integral controller).

<Harmonic Model>

Thus, the harmonic controller 45 is configured to use a harmonic model having the characteristic of a transfer function Gh corresponding to a sinusoidal or cosinusoidal periodic function, in which the first term on the right-hand side of the mathematical expression (12) is deleted, as expressed by the following mathematical expression.

$$Gh(s) = \frac{B_1(s)}{s^2 + \omega p^2} + \frac{B_2(s)}{s^2 + (2\omega p)^2} + \frac{B_3(s)}{s^2 + (3\omega p)^2} + \frac{B_4(s)}{s^2 + (4\omega p)^2} \tag{13}$$
$$= \sum_{n=1} \frac{B_n(s)}{s^2 + (n\omega p)^2}$$

Here, the denominator $(s^2 + (n\omega p)^2)$ of the transfer function Gh of the harmonic model expressed in the mathematical expression (13) is a transfer function corresponding to the sinusoidal or cosinusoidal periodic function having a frequency that is n times (n is a natural number larger than or equal to 1) the torque fluctuation frequency ωp. Thus, the harmonic model used by the harmonic controller 45 is configured to have a characteristic in which the characteristics of the transfer functions $(1/(s^2 + (n\omega p)^2))$ corresponding to the sinusoidal or cosinusoidal periodic functions having respective frequencies that are 1 to n times the torque fluctuation frequency ωp are arranged in parallel with each other.

In the present embodiment, as shown in FIG. 3 and the following mathematical expression, description will be made on an example in which the numerator Bn(s) of the transfer function Gh of the harmonic model expressed in the mathematical expression (13) is set to the zeroth-order (the zeroth power of s) transfer function, that is, a constant.

$$Gh(s) = \frac{Kh_1}{s^2 + \omega p^2} + \frac{Kh_2}{s^2 + (2\omega p)^2} + \frac{Kh_3}{s^2 + (3\omega p)^2} + \frac{Kh_4}{s^2 + (4\omega p)^2} \quad (14)$$

$$= \sum_{n=1} \frac{Kh_n}{s^2 + (n\omega p)^2}$$

Here, $Kh_1$ to $Kh_n$ are control gains of the harmonic controller 45, respectively corresponding to 1 to n times (n is a natural number larger than or equal to 2) the torque fluctuation frequency $\omega p$, and are set in consideration of the responsiveness and stability of the current feedback control system. The control gains $Kh_n$ may be configured to be changed in proportion to the torque fluctuation frequency $\omega p$.

As expressed in the following mathematical expression and the mathematical expression after the next, the numerator Bn(s) of the transfer function Gh of the harmonic model may be set to a first-order (the first power of s) or second-order (the second power of s) transfer function.

$$Gh(s) = \frac{Kh_1 s}{s^2 + \omega p^2} + \frac{Kh_2 s}{s^2 + (2\omega p)^2} + \frac{Kh_3 s}{s^2 + (3\omega p)^2} + \frac{Kh_4 s}{s^2 + (4\omega p)^2} \quad (15)$$

$$= \sum_{n=1} \frac{Kh_n s}{s^2 + (n\omega p)^2}$$

$$Gh(s) = \frac{Khp_1 s^2 + Khi_1 s}{s^2 + \omega p^2} + \frac{Khp_2 s^2 + Khi_2 s}{s^2 + (2\omega p)^2} + \frac{Khp_3 s^2 + Khi_3 s}{s^2 + (3\omega p)^2} + \quad (16)$$

$$\frac{Khp_4 s^2 + Khi_4 s}{s^2 + (4\omega p)^2}$$

$$= \sum_{n=1} \frac{Khp_n s^2 + Khi_n s}{s^2 + (n\omega p)^2}$$

Here, $Khp_1$ to $Khp_n$ and $Khi_1$, to $Khi_n$ are control gains of the harmonic controller 45, and respectively correspond to 1 to n times (n is a natural number larger than or equal to 2) the torque fluctuation frequency $\omega p$.

As shown in FIG. 9, when the output torque command value Tmo fluctuates not across 0, the proportion of the sinusoidal (or cosinusoidal) component of the torque fluctuation frequency $\omega p$ (first order) increases in each of the two-phase current commands Idc, Iqc. Thus, in the present embodiment, the harmonic model of each of the d-axis harmonic controller 50 and the q-axis harmonic controller 51 is configured to have the characteristic of the sinusoidal or cosinusoidal transfer function $(1/(s^2+\omega p^2))$ of the torque fluctuation frequency $\omega p$ (first order).

As shown in FIG. 8, when the output torque command value Tmo fluctuates across 0, particularly, fluctuates with a center that coincides with 0, the proportion of the sinusoidal (or cosinusoidal) component of the frequency that is twice (second order) the torque fluctuation frequency $\omega p$ significantly increases in the d-axis two-phase current command Idc. Thus, in the present embodiment, the harmonic model of the d-axis harmonic controller 50 is configured to have the characteristic of the sinusoidal or cosinusoidal transfer function $(1/(s^2+(2\omega p)^2))$ that is twice (second order) the torque fluctuation frequency $\omega p$ in addition to the sinusoidal wave or cosinusoidal wave of the torque fluctuation frequency $\omega p$.

When the output torque command value Tmo fluctuates across 0 as well, the proportion of the sinusoidal (or cosinusoidal) component having a frequency that is twice (second order) the torque fluctuation frequency $\omega p$ does not increase so much in the q-axis two-phase current command Iqc.

In the relationship characteristic of each of the current commands Idc, Iqc with the output torque command value Tmo, when a higher-order function component is large, the sinusoidal (or cosinusoidal) components having frequencies larger than or equal to twice (second order) the torque fluctuation frequency $\omega p$, included in a corresponding one of the two-phase current commands Idc, Iqc, increase. When sinusoidal or cosinusoidal components having frequencies that are 1 to n times the torque fluctuation frequency $\omega p$ are included in the output torque command value Tmo as well, higher-order components included in each of the two-phase current commands Idc, Iqc increase.

Thus, in these cases, the harmonic model of each of the d-axis harmonic controller 50 and the q-axis harmonic controller 51 may be configured to also have the characteristics of the sinusoidal or cosinusoidal transfer functions $(1/(s^2+(n\omega p)^2))$ having frequencies that are 1 to n times the torque fluctuation frequency $\omega p$. In this case, the value of n is set on the basis of the magnitude of a component of each order, included in each of the two-phase current commands Idc, Iqc. That is, a harmonic model having a degree of (n), corresponding to the order having a relatively large fluctuation component is provided.

In the present embodiment, as shown in FIG. 8 and FIG. 9, each of the two-phase current commands Idc, Iqc includes the first-order to fourth-order components in large amount, so the harmonic model of each of the d-axis harmonic controller 50 and the q-axis harmonic controller 51 is configured to have the characteristics of the sinusoidal or cosinusoidal transfer functions having frequencies that are 1 to 4 times (first order to fourth order) the torque fluctuation frequency $\omega p$.

As shown in FIG. 3, the d-axis harmonic controller 50 and the q-axis harmonic controller 51 each include a first-order harmonic controller 60, a second-order harmonic controller 61, a third-order harmonic controller 62 and a fourth-order harmonic controller 63 having respective harmonic models corresponding to respective frequencies (respective orders) of 1 to four times (first order to fourth order) the torque fluctuation frequency $\omega p$ in parallel with one another. As shown in FIG. 3 and the following mathematical expression, each of the harmonic controllers 60 to 63 is configured to input a current deviation between the two-phase actual current Id (or Iq) and the two-phase current command Idc (or Iqc) to the harmonic model of the corresponding frequency and then calculate the output of the harmonic model of the corresponding frequency as the harmonic two-phase voltage command Vhd (or Vhq). The frequency $\omega p$ of each harmonic model is changed on the basis of the input torque fluctuation frequency $\omega p$.

$$Vhd = Vhd_1 + Vhd_2 + Vhd_3 + Vhd_4 \quad (17)$$

$$= \frac{Khd_1}{s^2 + \omega p^2}(Idc - Id) + \frac{Khd_2}{s^2 + (2\omega p)^2}(Idc - Id) +$$

$$\frac{Khd_3}{s^2 + (3\omega p)^2}(Idc - Id) + \frac{Khd_4}{s^2 + (4\omega p)^2}(Idc - Id)$$

-continued $$Vhq = Vhq_1 + Vhq_2 + Vhq_3 + Vhq_4$$
$$= \frac{Khq_1}{s^2 + \omega p^2}(Iqc - Iq) + \frac{Khq_2}{s^2 + (2\omega p)^2}(Iqc - Iq) +$$
$$\frac{Khq_3}{s^2 + (3\omega p)^2}(Iqc - Iq) + \frac{Khq_4}{s^2 + (4\omega p)^2}(Iqc - Iq)$$

Figure 10:
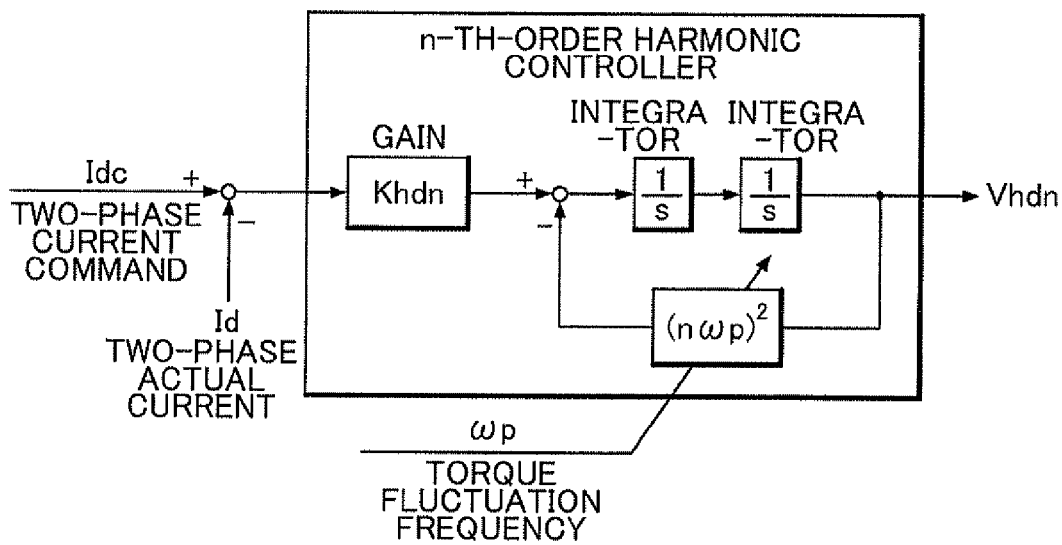
FIG. 10 is a block diagram of the control device according to the embodiment of the present invention.

Each of the harmonic controllers 60 to 63 (harmonic models of the respective frequencies) is, for example, configured to have two integrators and a feedback loop as shown in FIG. 10 and the following mathematical expression.

$$Vhd_n = \{Khd_n(Idc - Id) - (n\omega p)^2 Vhd_n\}\frac{1}{s}\frac{1}{s} \tag{18}$$

<Harmonic Control Execution Condition>

Next, a harmonic control execution condition will be described.

In the present embodiment, the harmonic controller 45 is configured to calculate the harmonic two-phase voltage commands Vhd, Vhq when a predetermined harmonic control execution condition is satisfied.

The harmonic controller 45 determines that the harmonic control execution condition is satisfied when torque fluctuation cancellation control is executed, the fluctuation cancellation torque command Tp has been calculated and the rate of change in the rotating electrical machine required torque is smaller than a determination value, and determines that the harmonic control execution condition is not satisfied other than the above case. Here, the harmonic controller 45 calculates the amount of change in the rotating electrical machine required torque during a predetermined period as the rate of change.

The harmonic controller 45 calculates the harmonic two-phase voltage commands Vhd, Vhq when the harmonic control execution condition is satisfied, and sets the harmonic two-phase voltage commands Vhd, Vhq to 0 when the harmonic control execution condition is not satisfied, With this configuration, when torque fluctuation cancellation control is not executed, it is possible to prevent the harmonic controller 45 from calculating unnecessary harmonic two-phase voltage commands Vhd, Vhq to provide a disturbance to the current feedback control system.

In addition, when the rate of change in the rotating electrical machine required torque is large, such as during acceleration or deceleration, it is possible to prevent the harmonic controller 45 from calculating unnecessary harmonic two-phase voltage commands Vhd, Vhq to impair a smooth increase or reduction in the output torque of the rotating electrical machine MG.

The harmonic controller 45 may be configured to determine that the harmonic control execution condition is not satisfied when the amplitude of the fluctuation cancellation torque command Tp is smaller than a predetermined value even when torque fluctuation cancellation control is executed.

The harmonic controller 45 is configured to set the parameters in the harmonic controller 45 to initial values when the harmonic control execution condition is not satisfied. At this time, when the harmonic controller 45 is configured as shown in FIG. 10, the values of the two integrators are set to 0.

Figure 11:
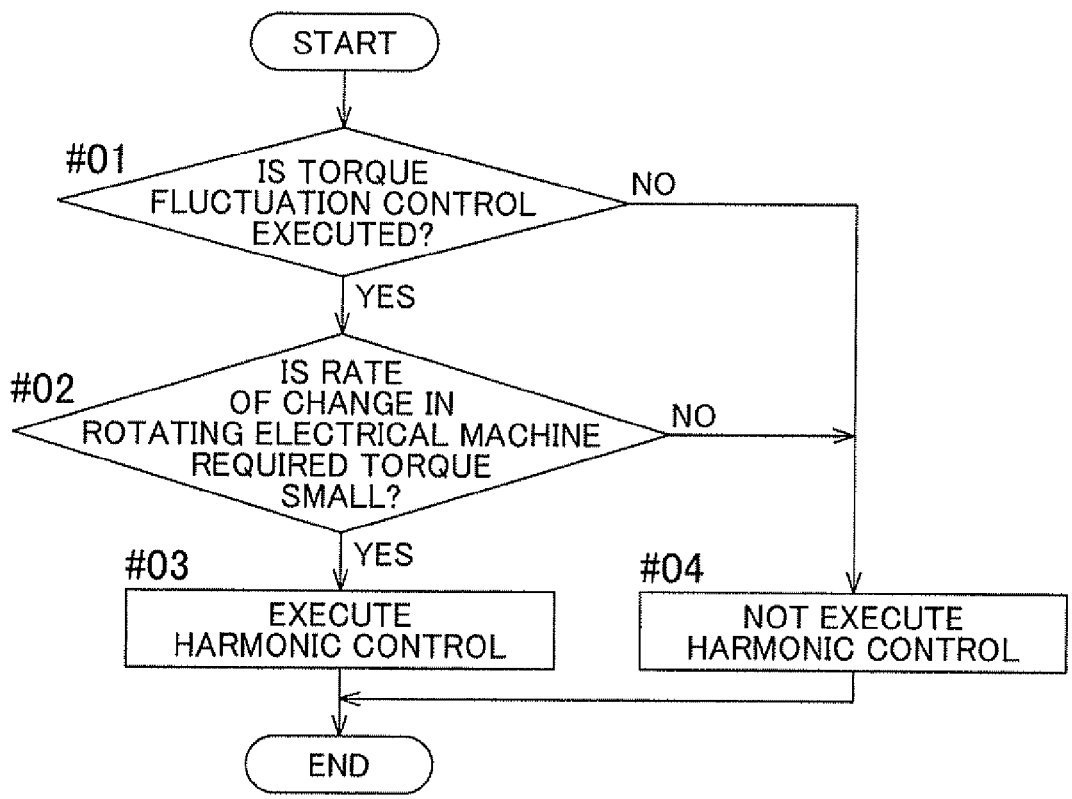
FIG. 11 is a flowchart that illustrates the process of the control device according to the embodiment of the present invention.

The process of the above-described harmonic control execution condition will be described with reference to the flowchart shown in FIG. 11.

In step #01, the harmonic controller 45 executes the process of determining whether torque fluctuation cancellation control is executed and the fluctuation cancellation torque command Tp has been calculated (step #01). When it is determined that torque fluctuation cancellation control is executed (Yes in step #01), the harmonic controller 45 executes the process of determining whether the rate of change in the rotating electrical machine required torque is smaller than the determination value (step #02). When it is determined that the rate of change in the rotating electrical machine required torque is smaller than the determination value (Yes in step #02), the harmonic controller 45 determines that the harmonic control execution condition is satisfied, calculates the harmonic two-phase voltage commands Vhd, Vhq, and executes harmonic control (step #03).

On the other hand, when it is determined that torque fluctuation cancellation control is not executed (No in step #01) or when it is determined that the rate of change in the rotating electrical machine required torque is larger than or equal to the determination value (No in step #02), the harmonic controller 45 determines that the harmonic control execution condition is not satisfied, sets the harmonic two-phase voltage commands Vhd, Vhq to 0, and does not execute harmonic control (inexecution) (step #04).

3-4-2-4. Two-phase/Three-phase Voltage Conversion Unit 43

The two-phase/three-phase voltage conversion unit 43 is a functional unit that converts the two-phase voltage commands Vd, Vq calculated by the current feedback control unit 42 to three-phase voltage commands Vu, Vv, Vw. That is, the two-phase voltage commands Vd, Vq expressed in the dq rotating coordinate system are subjected to fixed coordinate conversion and two-phase/three-phase conversion on the basis of the magnetic pole position θre, and are converted to the three-phase voltage commands Vu, Vv, Vw that are voltage commands to the respective three-phase coils. The two-phase/three-phase voltage conversion unit 43 may be configured to execute the process of adjusting the percentage modulation of each of the three-phase voltage commands Vu, Vv, Vw.

3-4-2-5. Inverter Control Unit 44

The inverter control unit 44 generates an inverter control signal Suvw for controlling on/off operations of the plurality of switching elements of the inverter IN on the basis of the three-phase voltage commands Vu, Vv, Vw.

In the present embodiment, the inverter control unit 44 generates the inverter control signal Suvw through pulse width modulation (PWM) based on a comparison between the three-phase voltage commands Vu, Vv, Vw and a carrier wave.

The mode of pulse width modulation may be configured to be switchable to sinusoidal PWM (SPWM), space vector PWM (SVPWM), third harmonics injection PWM (THIPWM), discontinuous PWM (DPWM), or the like.

3-4-2-6. Behavior of Harmonic Control

Next, the behavior of harmonic control will be described with reference to FIG. 12 to FIG. 14.

<First-Order Harmonic Model>

Figure 12:
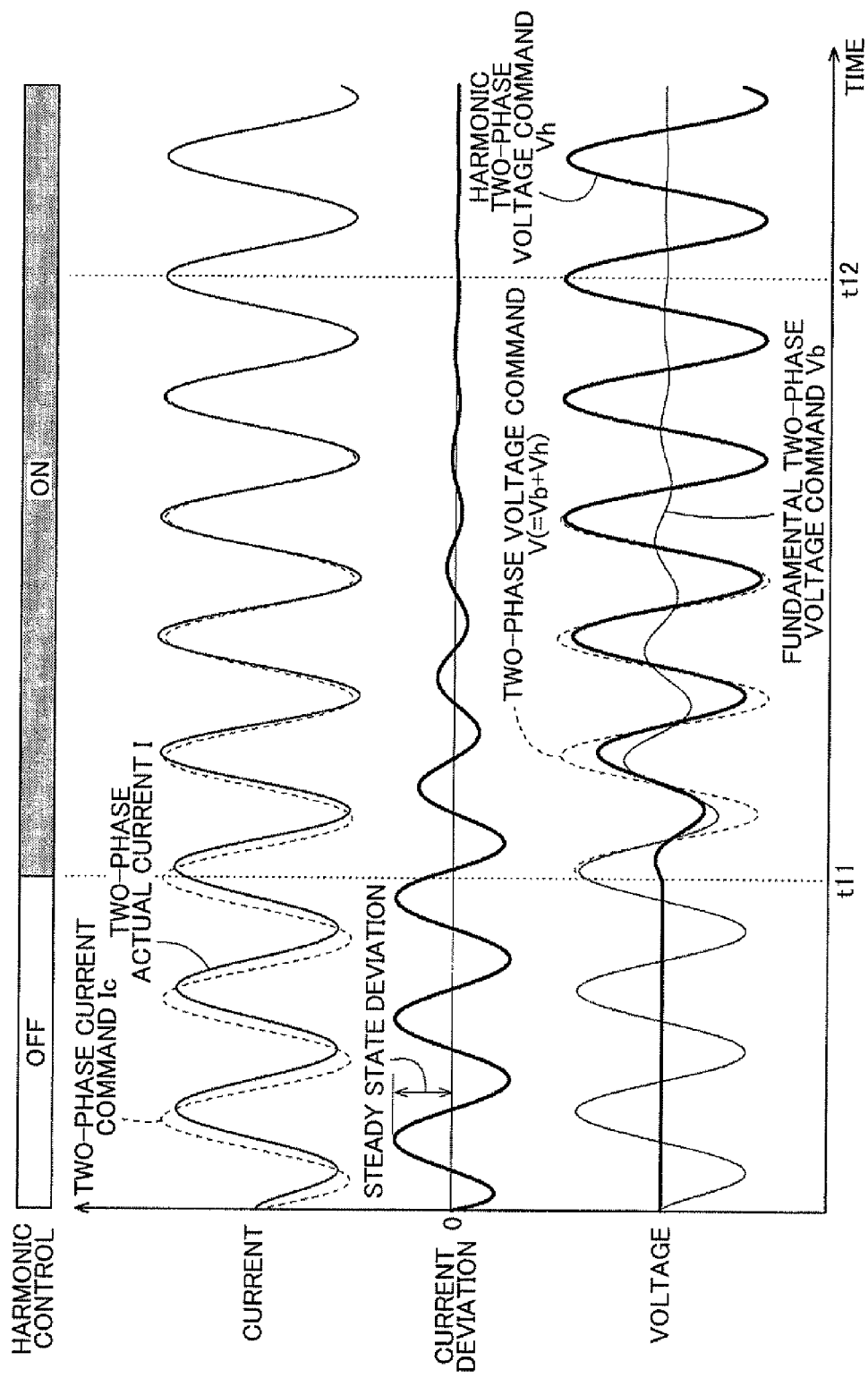
FIG. 12 is a timing diagram that illustrates the process of the control device according to the embodiment of the present invention.

FIG. 12 shows an example of the case where, in the two-phase current commands Idc, Iqc, the proportion of the component of the torque fluctuation frequency op is large (in FIG. 12, 100%) and the harmonic controller 45 is configured to have the characteristic of the sinusoidal or cosinusoidal transfer function $(1/(s^2+\omega p^2))$ having only the torque fluctuation frequency ωp (first order).

Until time t11, harmonic control is not executed, the harmonic two-phase voltage command Vh is set to 0, and the two-phase voltage command V is formed of the fundamental two-phase voltage command Vb calculated by the fundamental controller 46 formed of a proportional-plus-integral operator. The fundamental two-phase voltage command Vb is periodically varying in order to bring the two-phase actual current I into coincidence with the two-phase current command Ic fluctuating at the torque fluctuation frequency ωp, and the two-phase actual current I tracks the periodically fluctuating two-phase current command Ic with a phase delay and a gain decrease, has a steady state deviation in a current deviation.

On the other hand, when harmonic control is started at time t11, the first-order harmonic two-phase voltage command Vh starts fluctuating at the torque fluctuation frequency ωp in a self-excitation manner and increases its amplitude with the current deviation between the two-phase current command Ic and the two-phase actual current I. At this time, as shown in FIG. 10, the harmonic model functions to integrate the current deviation, fluctuates at the torque fluctuation frequency ωp in a self-excitation manner and generates the harmonic two-phase voltage command Vh. In addition, the current deviation is fluctuating at the torque fluctuation frequency ωp. Therefore, the phase of the harmonic two-phase voltage command Vh fluctuating at the torque fluctuation frequency ωp is advanced or retarded in a direction in which the current deviation reduces, and the amplitude of the harmonic two-phase voltage command Vh is increased or reduced in a direction in which the current command reduces. Thus, the current deviation between the two-phase voltage command V and the two-phase actual current I reduces.

Therefore, the fundamental two-phase voltage command Vb that is calculated on the basis of the current deviation also reduces. At time t12, because of the first-order harmonic two-phase voltage command Vh, the two-phase actual current I is caused to track the two-phase current command Ic by reducing the steady state deviation, and the periodic change of the fundamental two-phase voltage command Vb is reduced to near 0.

<First-Order to Fourth-Order Harmonic Models>

Figure 13:
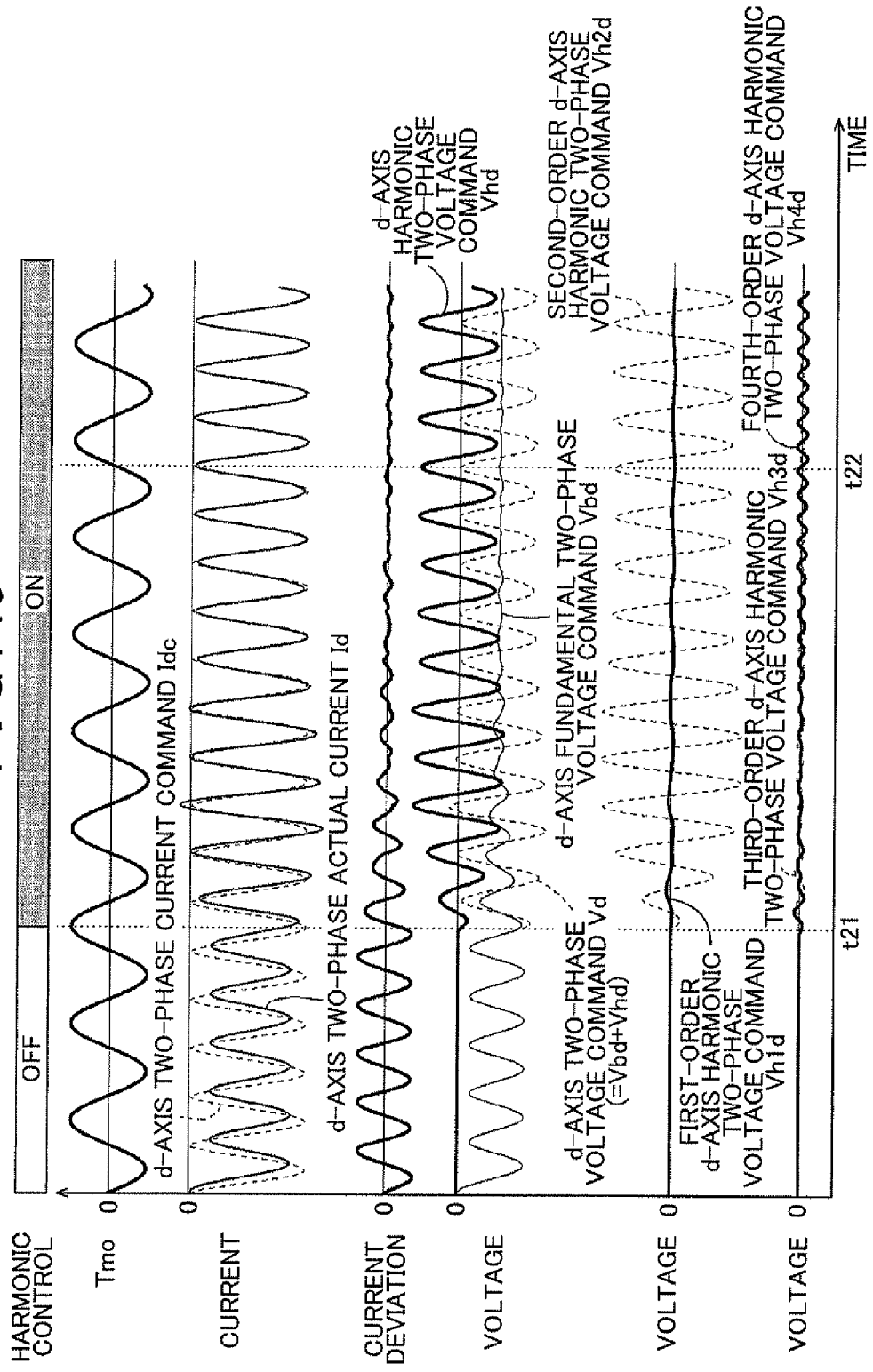
FIG. 13 is a timing diagram that illustrates the process of the control device according to the embodiment of the present invention.
Figure 14:
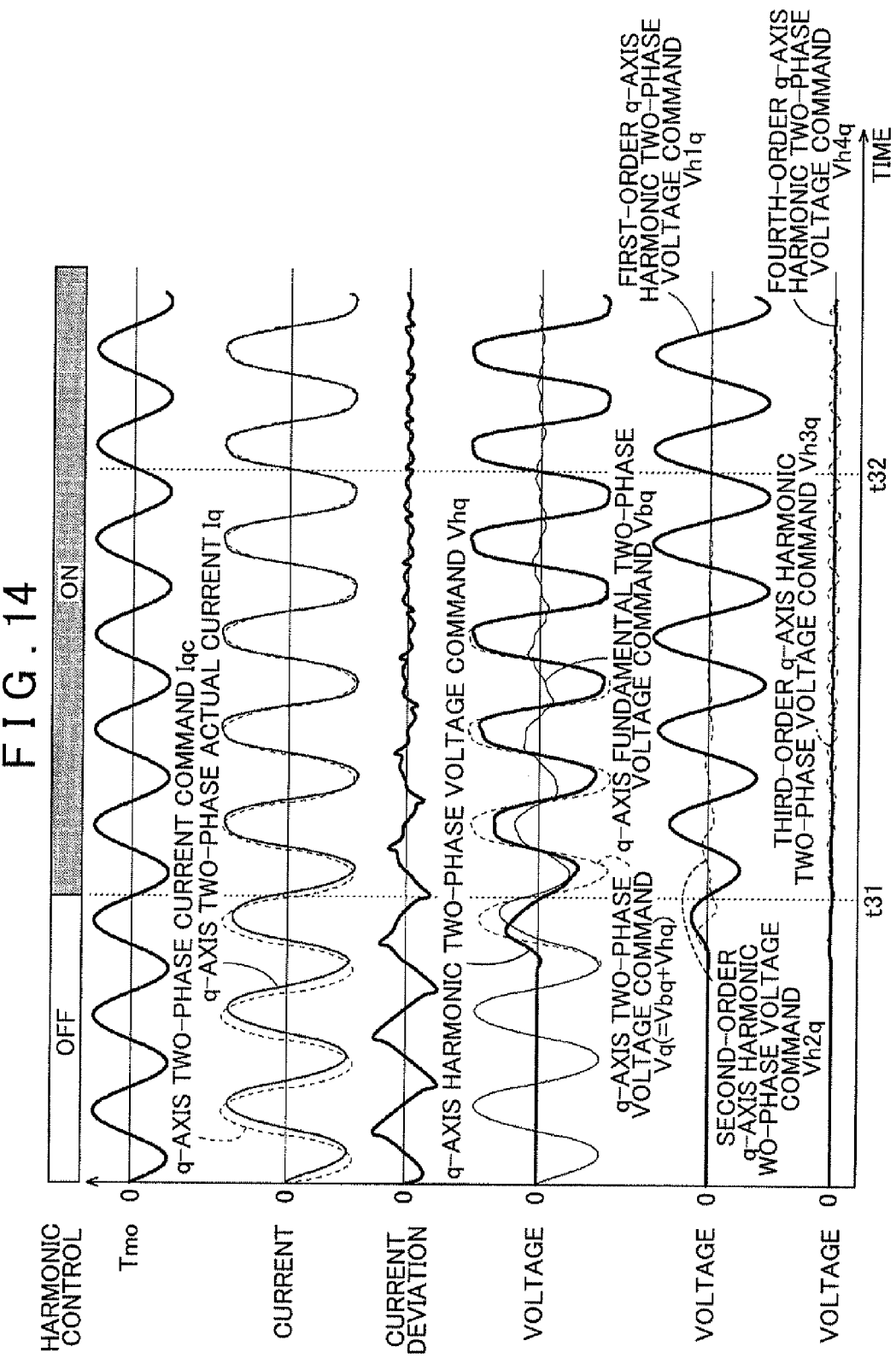
FIG. 14 is a timing diagram that illustrates the process of the control device according to the embodiment of the present invention.

FIG. 13 and FIG. 14 show an example in the case where, as in the case where the output torque command value Tmo fluctuates across 0 as shown in FIG. 8, each of the two-phase current commands Idc, Iqc mainly includes the frequency components that are two to four times the torque fluctuation frequency ωp and the harmonic controller 45 is configured to have the characteristics of the sinusoidal or cosinusoidal transfer functions $(1/(s^2+(n\omega p)^2))$ that are one to four times the torque fluctuation frequency ωp. FIG. 13 shows the behavior of the d-axis current. FIG. 14 shows the behavior of the q-axis current.

[d-Axis Current]

First, an example of the behavior of the d-axis current shown in FIG. 13 will be described.

The output torque command value Tmo fluctuates at the torque fluctuation frequency ωp with a center that coincides with 0, and, as described with reference to FIG. 8, the d-axis two-phase current command Idc mainly fluctuates at the frequency that is twice the torque fluctuation frequency ωp.

Until time t21, harmonic control is not executed, and, because of the d-axis fundamental two-phase voltage command Vbd, the d-axis two-phase actual current Id tracks the periodically fluctuating d-axis two-phase current command Idc with a phase delay and a gain decrease, and has a steady state deviation.

On the other hand, when harmonic control is started at time t21, the current deviation between the d-axis two-phase current command Idc and the d-axis two-phase actual current Id is fluctuating at the frequency that is twice (second order) the torque fluctuation frequency ωp, so a second-order d-axis harmonic two-phase voltage command Vh2d starts fluctuating at the frequency that is twice the torque fluctuation frequency ωp in a self-excitation manner and increases its amplitude on the basis of the current deviation, but the amplitude of a first-order d-axis harmonic two-phase voltage command Vh1d does not increase so much.

In addition, as described with reference to FIG. 8, the d-axis two-phase current command Idc also includes the fluctuation component having a frequency that is four times (fourth order) the torque fluctuation frequency ωp, so the current deviation also includes the fourth-order fluctuation component. Therefore, a fourth-order d-axis harmonic two-phase voltage command Vh4d starts fluctuating at the frequency that is four times the torque fluctuation frequency ωp in a self-excitation manner and increases its amplitude on the basis of the current deviation, but the amplitude of a third-order d-axis harmonic two-phase voltage command Vh3d does not increase so much.

Thus, the current deviation reduces with an increase in the second-order and fourth-order d-axis harmonic two-phase voltage commands Vh2d, Vh4d.

Therefore, the d-axis fundamental two-phase voltage command Vbd that is calculated on the basis of the current deviation also reduces. At time t22, because of the second-order and fourth-order d-axis harmonic two-phase voltage commands Vh2d, Vh4d, the d-axis two-phase actual current Id is caused to track the d-axis two-phase current command Idc by significantly reducing the steady state deviation, and the periodic change of the d-axis fundamental two-phase voltage command Vbd is reduced to near 0.

[q-Axis Current]

Next, an example of the behavior of the q-axis current shown in FIG. 14 will be described.

As in the case of FIG. 13, the output torque command value Tmo fluctuates at the torque fluctuation frequency ωp with a center that coincides with 0, and, as described with reference to FIG. 8, the q-axis two-phase current command Iqc mainly fluctuates at the torque fluctuation frequency ωp.

Until time t31, harmonic control is not executed, and the q-axis two-phase actual current Iq tracks the periodically fluctuating q-axis two-phase current command Iqc with a phase delay and a gain decrease, and has a steady state deviation.

On the other hand, when harmonic control is started at time t31, because the current deviation between the q-axis two-phase current command Iqc and the q-axis two-phase actual current Iq is fluctuating at the frequency of the torque fluctuation frequency ωp, a first-order q-axis harmonic two-phase voltage command Vh1q starts fluctuating at the torque fluctuation frequency ωp in a self-excitation manner and increases its amplitude on the basis of the current deviation, but the amplitude of a second q-axis harmonic two-phase voltage command Vh2q does not increase so much.

In addition, as described with reference to FIG. 8, the q-axis two-phase current command Iqc also includes the fluctuation component having three times (third order) the torque fluctuation frequency ωp, so the current deviation also includes the third-order fluctuation component. Therefore, a third-order q-axis harmonic two-phase voltage command Vh3q starts fluctuating at the frequency that is three times the torque fluctuation frequency ωp in a self-excitation manner and increases its amplitude on the basis of the current deviation, but the amplitude of a fourth-order q-axis harmonic two-phase voltage command Vh4q does not increase so much.

Thus, the current deviation reduces with an increase in the first-order and third-order q-axis harmonic two-phase voltage commands Vh1q, Vh3q.

Therefore, the q-axis fundamental two-phase voltage command Vbq that is calculated on the basis of the current deviation also reduces. At time t32, because of the first-order and third-order q-axis harmonic two-phase voltage commands Vh1q, Vh3q, the q-axis two-phase actual current Iq is caused to track the q-axis two-phase current command Iqc by significantly reducing a periodic steady state deviation, and the periodic change of the q-axis fundamental two-phase voltage command Vbq is reduced to near 0.

3-4-2-7. Computation Timing

Next, the timing at which the computation process of each functional unit of the rotating electrical machine control device 32 will be described with reference to the timing diagram shown in FIG. 15 and the flowchart shown in FIG. 16.

The rotating electrical machine control device 32 is configured to execute a series of interrupt processes at an reference computation interval T0 with the use of a PWM timer, or the like (Yes in step #11).

First, at the interrupt process timing at each reference computation interval T0, the rotating electrical machine control device 32 executes magnetic pole position sampling (PS) for detecting the magnetic pole position θre of the rotating electrical machine MG on the basis of the input signal from the input shaft rotation speed sensor Se2 (step #12). The rotating electrical machine control device 32 executes current value sampling (IS) for detecting the actual currents Iu, Iv, Iw flowing through the phase coils of the rotating electrical machine MG on the basis of the input signals from the current sensor Se4 (step #13).

Subsequently, the rotating electrical machine control device 32 executes the process of current control (IC) (step #14). The current control (IC) includes the processes of the torque current computing unit 40, the actual current computing unit 41 and the current feedback control unit 42.

Figure 15:
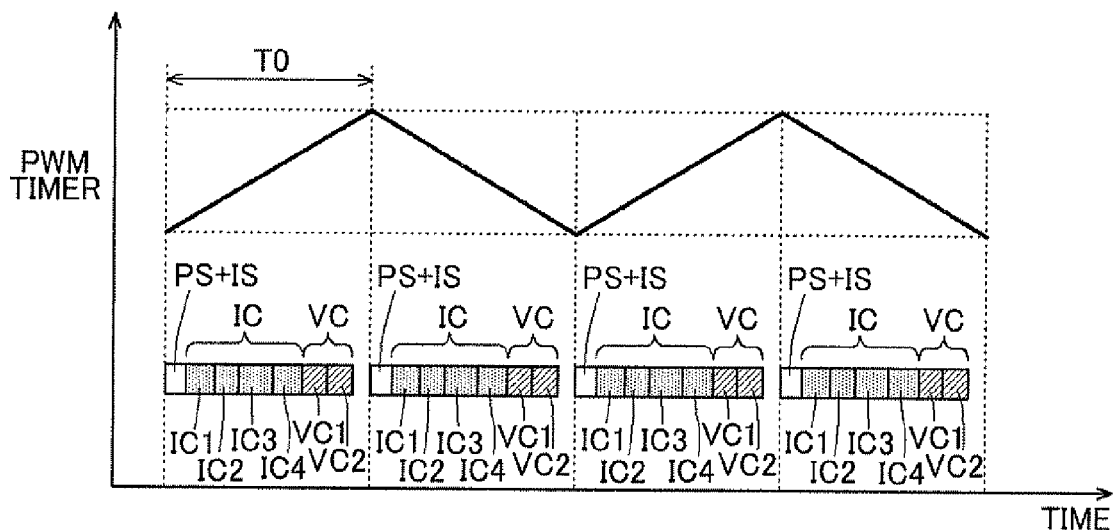
FIG. 15 is a timing diagram that illustrates the process of the control device according to the embodiment of the present invention.
Figure 16:
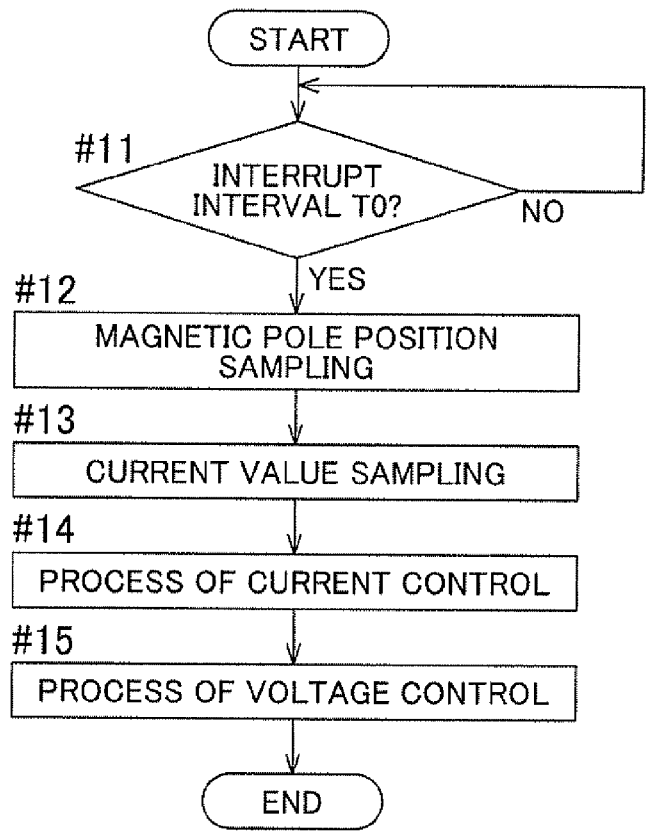
FIG. 16 is a flowchart that illustrates the process of the control device according to the embodiment of the present invention.

In the present embodiment, as shown in the timing diagram of FIG. 15, the rotating electrical machine control device 32 executes the process of the actual current computing unit 41 (IC1), and converts the three-phase actual currents Iu, Iv, Iw to the two-phase actual currents Id, Iq expressed in the dq rotating coordinate system through three-phase/two-phase conversion and rotating coordinate conversion on the basis of the magnetic pole position θre. Subsequently, the rotating electrical machine control device 32 executes the process of the torque current computing unit 40 (IC2), and computes the two-phase current commands Idc, Iqc on the basis of the output torque command value Tmo. The rotating electrical machine control device 32 executes the process of the current feedback control unit 42, and varies the two-phase voltage commands Vd, Vq such that the two-phase actual currents Id, Iq approach the two-phase current commands Idc, Iqc. At this time, the rotating electrical machine control device 32 executes the process of the fundamental controller 46 (IC3), and then executes the process of the harmonic controller 45 (IC4).

Subsequently, the rotating electrical machine control device 32 executes the process of voltage control (VC) (step #15). The voltage control (VC) includes the processes of the two-phase/three-phase voltage conversion unit 43 and the inverter control unit 44.

In the present embodiment, the rotating electrical machine control device 32 executes the process of the two-phase/three-phase voltage conversion unit 43 (VC1), and converts the two-phase voltage commands Vd, Vq to the three-phase voltage commands Vu, Vv, Vw. Subsequently, the rotating electrical machine control device 32 executes the process of the inverter control unit 44 (VC2), and generates the inverter control signal Suvw through pulse width modulation on the basis of the three-phase voltage commands Vu, Vv, Vw.

Figure 17:
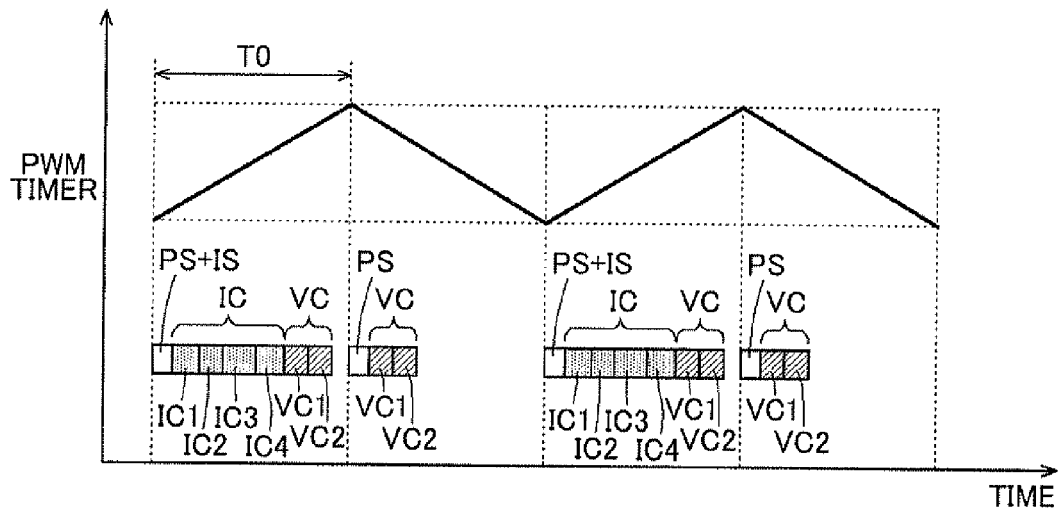
FIG. 17 is a timing diagram that illustrates the process of the control device according to the embodiment of the present invention.
Figure 18:
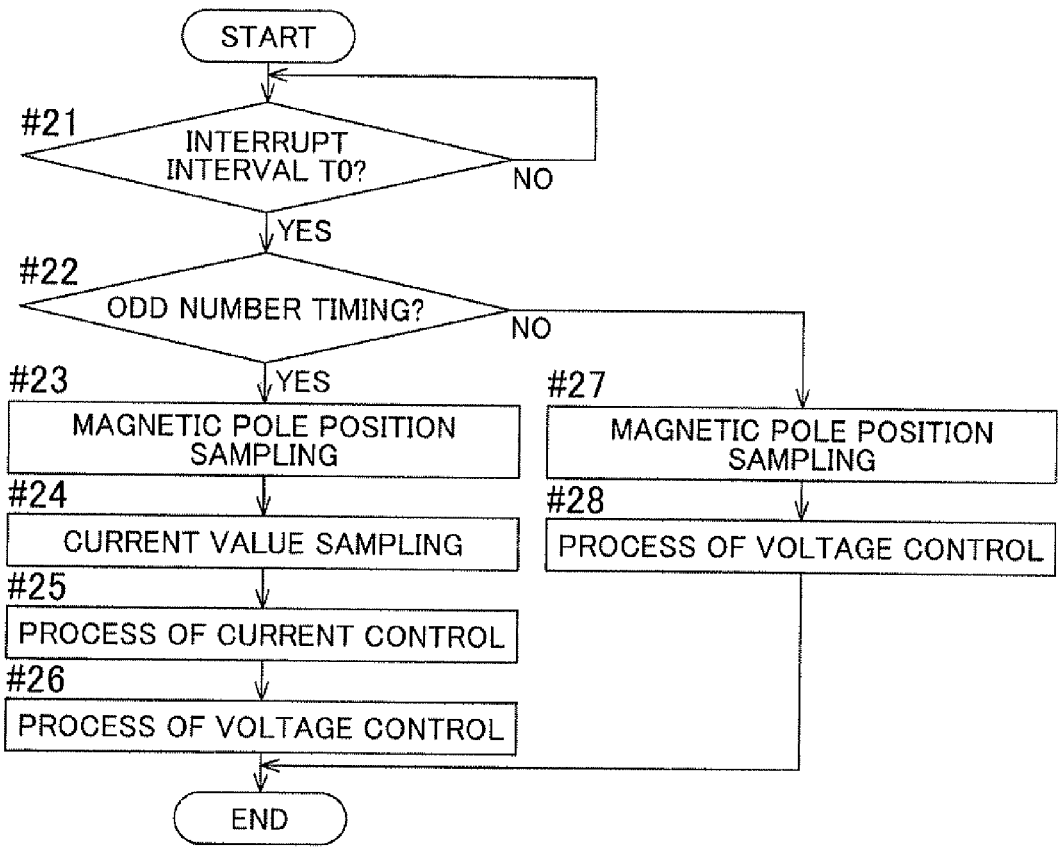
FIG. 18 is a flowchart that illustrates the process of the control device according to the embodiment of the present invention.

Here, the rotating electrical machine control device 32 may be configured to execute the processes at timings shown in the timing diagram of FIG. 17 and the flowchart of FIG. 18.

That is, the processing load of the computing device is reduced by reducing the frequency of the process of current control (IC) that uses direct-current signals obtained by expressing alternating-current signals in the dq rotating coordinate system with respect to the frequency of the process of voltage control (VC) that uses three-phase voltages that are the alternating-current signals. In the present embodiment, the frequency of the process of current control (IC) is half the frequency of the process of voltage control (VC) by executing the process of current control (IC) once per two reference computation intervals T0 (two intervals).

In this case as well, the rotating electrical machine control device 32 is configured to execute a series of interrupt processes at each reference computation interval T0 with the use of the PWM timer, or the like (Yes in step #21).

First, at the interrupt process timing at each reference computation interval T0, the rotating electrical machine control device 32 determines whether the current interrupt process is at odd-number timing or even-number timing (step #22).

When the current interrupt process is at odd-number timing (Yes in step #22), both the process of current control (IC) and the process of voltage control (VC) are executed as in the case of the process illustrated with reference to FIG. 15 and FIG. 16.

That is, first, the rotating electrical machine control device 32 executes magnetic pole position sampling (PS) (step #23), and executes current value sampling (IS) (step #24).

Subsequently, the rotating electrical machine control device 32 executes the process of current control (IC) (step #25). In the present embodiment, as shown in the timing diagram of FIG. 17, the rotating electrical machine control device 32 executes the process of the actual current computing unit 41 (IC1), the process of the torque current computing unit 40 (IC2), the process of the fundamental controller 46 (IC3) and the process of the harmonic controller 45 (IC4).

The rotating electrical machine control device 32 executes the process of voltage control (VC) (step #26). In the present embodiment, the rotating electrical machine control device 32 executes the process of the two-phase/three-phase voltage conversion unit 43 (VC1), and then executes the process of the inverter control unit 44 (VC2).

On the other hand, when the current interrupt process is at even-number timing (No in step #22), the rotating electrical machine control device 32 executes magnetic pole position sampling (PS) required for voltage control (step #27), and, after that, executes the process of voltage control (VC) (step #28). Here, the process of voltage control (VC), as in the case at the odd-number timing, after the process of the two-phase/three-phase voltage conversion unit 43 (VC1) is executed, the process of the inverter control unit 44 (VC2) is executed. Thus, in the case at the even-number timing, the process of current control (IC) is not executed, and the processing load is reduced. Hence, it is possible to suppress an excessive increase in processing load due to execution of harmonic control.

OTHER EMBODIMENTS

Lastly, other embodiments of the present invention will be described. The configurations of embodiments described below are not limited to applications solely, and, unless there is no contradiction, are applicable in combination with the configuration of another embodiment.

(1) In the above-described embodiment, the description is made on an example in which the hybrid vehicle includes the control devices 31 to 34 and the rotating electrical machine control device 32 includes the functional units 40 to 44, 70. However, embodiments of the present invention are not limited to this configuration. That is, the rotating electrical machine control device 32 may be configured as a control device integrated selectively in combination with the plurality of control devices 31, 33, 34, and distribution of functional units of the control devices 31 to 34 may also be selectively set.

(2) In the above-described embodiment, the description is made on an example in which the rotating electrical machine control device 32 includes the torque fluctuation cancellation control unit 70. However, embodiments of the present invention are not limited to this configuration. That is, a configuration that another control device, such as the vehicle control device 34, includes the torque fluctuation cancellation control unit 70 is also one of preferred embodiments of the present invention.

(3) In the above-described embodiment, a configuration that includes, in addition to the speed change mechanism TM, a friction engagement element that allows or disconnects drivable coupling between the rotating electrical machine MG and the wheels W or a friction engagement element that directly engages a torque converter with input/output members of the torque converter is also one of preferred embodiments of the present invention.

(4) In the above-described embodiment, the description is made on an example in which the speed change mechanism TM is a step-gear automatic transmission. However, embodiments of the present invention are not limited to this configuration. That is, a configuration that the speed change mechanism TM is a transmission other than the step-gear automatic transmission, such as a continuously variable automatic transmission that is able to change a speed ratio continuously, is also one of preferred embodiments of the present invention.

(5) In the above-described embodiment, the description is made on an example in which the first power transmission mechanism 10 is formed of members, such as the damper, the engine output shaft Eo and the input shaft I, and the second power transmission mechanism 11 is formed of members, such as the intermediate shaft M, the speed change mechanism TM, the output shaft O and the axles AX. However, embodiments of the present invention are not limited to this configuration. That is, the first power transmission mechanism 10 and the second power transmission mechanism 11 each at least need to be a mechanism that allows coupling such that power is transmittable, and each may be, for example, only a shaft. In addition, the first power transmission mechanism 10 and the second power transmission mechanism 11 may have one or a plurality of elements selected from among a shaft, a clutch, a damper, a gear and a speed change mechanism.

(6) In the above-described embodiment, the description is made on an example in which the rotating electrical machine MG is provided in the power transmission path between the engine E and the wheels W. However, embodiments of the present invention are not limited to this configuration. That is, a configuration that the rotating electrical machine MG is drivably coupled to the output shaft of the engine E on a side across the engine E from the wheel W side is also one of preferred embodiments of the present invention.

(7) In the above-described embodiment, the description is made on an example in which the d-axis harmonic controller 50 and the q-axis harmonic controller 51 each include the controllers having the characteristics of the transfer functions corresponding to sinusoidal waves having the frequencies that are once (first order) to four times (fourth order) the torque fluctuation frequency $\omega p$. However, embodiments of the present invention are not limited to this configuration. That is, a configuration that the d-axis harmonic controller 50 includes controllers having only the characteristics of the transfer functions corresponding to the sinusoidal waves or cosinusoidal waves having frequencies that are once (first order) and twice (second order) the torque fluctuation frequency $\omega p$ and the q-axis harmonic controller 51 includes a controller having only the characteristic of the transfer function corresponding to the sinusoidal wave or cosinusoidal wave having the torque fluctuation frequency $\omega p$ (first order) is also one of preferred embodiments of the present invention.

As described above, as shown in FIG. 8, the d-axis two-phase current command Idc mainly fluctuates at the frequency that is twice (second order) the torque fluctuation frequency $\omega p$ when the output torque command value Tmo fluctuates across 0 (particularly, fluctuates with a center that coincides with 0), and, as shown in FIG. 9, mainly fluctuates at the frequency of the torque fluctuation frequency $\omega p$ (first order) when the output torque command value Tmo fluctuates not across 0. Thus, when the d-axis harmonic controller 50 is formed of the first-order and second-order harmonic models, it is possible to cause the d-axis two-phase actual current Id to track the d-axis two-phase current command Idc by significantly reducing the steady state deviation for both the case where the output torque command value Tmo fluctuates across 0 and the case where the output torque command value Tmo fluctuates not across 0. At this time, the d-axis two-phase current command Idc includes the fluctuation components having frequencies that are three times (third order) or higher the torque fluctuation frequency $\omega p$, but the proportion of those fluctuation components is not so high, so it is possible to significantly reduce the steady state deviation with only the first-order and second-order harmonic models.

As described above, as shown in FIG. 8 and FIG. 9, the q-axis two-phase current command Iqc mainly fluctuates at the torque fluctuation frequency $\omega p$ (first order) in both the case where the output torque command value Tmo fluctuates across 0 and the case where the output torque command value Tmo fluctuates not across 0. Thus, when the q-axis harmonic controller 51 is formed of the first-order harmonic model, it is possible to cause the q-axis two-phase actual current Iq to track the q-axis two-phase current command Iqc by significantly reducing the steady state deviation for both the case where the output torque command value Tmo fluctuates across 0 and the case where the output torque command value Tmo fluctuates not across 0. At this time, the q-axis two-phase current command Iqc includes the fluctuation components having frequencies that are three times (third order) or higher the torque fluctuation frequency $\omega p$, but the proportion of those fluctuation components is not so high, so it is possible to significantly reduce the steady state deviation with only the first-order harmonic model.

(8) In the above-described embodiment, the description is made on an example in which the d-axis harmonic controller 50 and the q-axis harmonic controller 51 each include the controllers having the characteristics of the transfer functions corresponding to sinusoidal waves having frequencies that are once (first order) to four times (fourth order) the torque fluctuation frequency $\omega p$. However, embodiments of the present invention are not limited to this configuration. That is, a configuration that the d-axis harmonic controller 50 and the q-axis harmonic controller 51 each are configured to include controllers having the characteristics of the transfer functions corresponding to the sinusoidal waves or cosinusoidal waves having frequencies that are once to selected natural number times, such as only the torque fluctuation frequency ωp (first order), only the frequencies that are once (first order) to three times (third order) the torque fluctuation frequency ωp and only the frequencies that are once (first order) to eight times (eighth order), is also one of preferred embodiments of the present invention.

The present invention is suitably usable in a control device for controlling a rotating electrical machine that is drivably coupled to an internal combustion engine and that is drivably coupled to a wheel.

The invention claimed is:

1. A control device used to control a rotating electrical machine that is drivably coupled to an internal combustion engine and that is drivably coupled to a wheel, comprising:

a torque current computing unit that uses a two-axis rotating coordinate system that is a rotating coordinate system having two axes that rotate in synchronization with rotation of the rotating electrical machine, and that computes two-phase current commands, which express currents to be flowed through the rotating electrical machine in the two-axis rotating coordinate system, on the basis of a torque command that the rotating electrical machine is caused to output;

an actual current computing unit that computes two-phase actual currents expressed in the two-axis rotating coordinate system on the basis of actual currents flowing through the rotating electrical machine;

a current feedback control unit that varies two-phase voltage commands, which express voltage commands to be applied to the rotating electrical machine in the two-axis rotation coordinate system, such that the two-phase actual currents approach the two-phase current commands; and a voltage control unit that controls voltages to be applied to the rotating electrical machine on the basis of the two-phase voltage commands, wherein the torque command includes a fluctuation cancellation torque command that is a torque command for cancelling transmission torque fluctuations that are torque fluctuations transmitted from the internal combustion engine to the rotating electrical machine, and the current feedback control unit includes a harmonic controller that calculates the two-phase voltage commands by using a characteristic of a transfer function corresponding to a periodic function of a torque fluctuation frequency that is a frequency of the transmission torque fluctuations.

2. The control device according to claim 1, wherein the harmonic controller calculates the two-phase voltage commands by using an operator having a characteristic of a transfer function corresponding to a sinusoidal wave or cosinusoidal wave of the torque fluctuation frequency.

3. The control device according to claim 1, wherein the harmonic controller calculates the two-phase voltage commands by using a characteristic in which characteristics of transfer functions corresponding to respective periodic functions of frequencies that are natural number multiples of 1 to n (n is a natural number larger than or equal to 2) of the torque fluctuation frequency are arranged in parallel with each other.

4. The control device according to claim 1, wherein the current feedback control unit includes: a proportional-plus-integral controller that calculates fundamental voltage commands through proportional computation and integral computation on the basis of deviations between the two-phase actual currents and the two-phase current commands; and the harmonic controller that calculates harmonic voltage commands through computation using the characteristic of the transfer function corresponding to the periodic function of the torque fluctuation frequency on the basis of the deviations, and the current feedback control unit calculates the two-phase voltage commands by adding the fundamental voltage commands to the harmonic voltage commands.

5. The control device according to claim 1, wherein the fluctuation cancellation torque command includes a sinusoidal component or cosinusoidal component of the frequency of the transmission torque fluctuations.

* * * * *